US011914737B2

(12) United States Patent
Jacobs et al.

(10) Patent No.: US 11,914,737 B2
(45) Date of Patent: Feb. 27, 2024

(54) AUTHENTICATED AND ENCRYPTED ARCHIVES

(71) Applicant: Apple Inc., Cupertino, CA (US)

(72) Inventors: Frederic Jacobs, Canton of Vaud (CH); Eric Bainville, Sunnyvale, CA (US); Yannick L. Sierra, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 382 days.

(21) Appl. No.: 17/242,105

(22) Filed: Apr. 27, 2021

(65) Prior Publication Data
US 2022/0092208 A1 Mar. 24, 2022

Related U.S. Application Data

(60) Provisional application No. 63/082,845, filed on Sep. 24, 2020.

(51) Int. Cl.
*G06F 21/62* (2013.01)
*H04L 9/08* (2006.01)
*H04L 9/32* (2006.01)

(52) U.S. Cl.
CPC ........ *G06F 21/6227* (2013.01); *H04L 9/0861* (2013.01); *H04L 9/0894* (2013.01); *H04L 9/3247* (2013.01); *G06F 2221/2107* (2013.01)

(58) Field of Classification Search
CPC . G06F 21/6227; H04L 9/0861; H04L 9/0894; H04L 9/3247
USPC ........................................... 713/193
See application file for complete search history.

(56) References Cited

U.S. PATENT DOCUMENTS 8,140,786 B2\* 3/2012 Bunte ................. G06F 11/1451
711/161
2017/0126642 A1\* 5/2017 Basin ........................ H04L 9/14
2018/0060177 A1\* 3/2018 Shanthaveerappa ........................
G06F 11/1458

\* cited by examiner

*Primary Examiner* — Kambiz Zand
*Assistant Examiner* — Phuc Pham
(74) *Attorney, Agent, or Firm* — Kilpatrick Townsend & Stockton LLP

(57) ABSTRACT

Embodiments described herein provide a compressed container format that enables the container to be decrypted and decompressed in a streaming manner. One embodiment provides a container format for encrypted archives in which data is compressed and encrypted in a segmented manner. A segment of the archive can be decompressed, decrypted, and checked for integrity before the entire archive is received. Metadata for the encrypted archive is also encrypted to secure details of data stored within the archive.

21 Claims, 16 Drawing Sheets

AUTHENTICATED AND ENCRYPTED ARCHIVES

CROSS-REFERENCE

This application claims the benefit of priority of U.S. Provisional Application No. 63/082,845 filed Sep. 24, 2020 which is incorporated herein by reference.

FIELD

Embodiments described herein relate generally to a technique to enable authenticated encryption for compressed containers.

BACKGROUND OF THE DESCRIPTION

File compression can be applied to a single file or to an archive containing multiple files. Additionally, the integrity and/or authenticity of the file or archive can be verified using a message authentication code. Files or archives that contain data for which access should be restricted can also be encrypted. Content that will be delivered to a large number of clients can be posted to a content delivery network to facilitate the delivery of the content to recipients. Compression of the content will reduce the amount of time and network bandwidth required to download the content and reduce the amount of storage space used to store the content. Integrity checks enable verification that the received content is the same as the content that was transmitted. However, depending on the container and/or compression format, the decompression, decryption, or authentication of an encrypted and compressed container may require the entire file to be received at the recipient device.

SUMMARY OF THE DESCRIPTION

Embodiments described herein provide systems and methods that implement a signed, encrypted, and compressed container that may be decrypted, decompressed, and authenticated in a streaming manner. A signed, encrypted, and/or compressed archive or container described herein can be appended to without reading and recomputing the authentication tags on existing encrypted and authenticated data. New data can be appended that is compressed and/or separately encrypted. Accordingly, existing data is not required to be decrypted and/or decompressed before new encrypted and/or compressed data is added to the archive. Furthermore, data can be decompressed and decrypted out of order, enabling random access to an archive and parallel access of multiple segments using multiple network streams while still preserving authenticity guarantees. Streaming decryption is secured in part via the use of collision-resistant MAC functions that enable tamper detection even in the event that an attacker possesess the archive encryption key. Furthermore, the use of an encrypted signature enables signature hiding for encrypted assets, such that the assests may be stored to unsecured locations without leaking the source of the archive via an unencrypted signature.

One embodiment provides for a method comprising, on a computing device having one or more processors, receiving a request to access data at a specified location within an archive container, where the archive is a signed, encrypted, and/or compressed container, retrieving stored cryptographic material used to unlock and authenticate the archive container, deriving a multi-level key hierarchy from the stored cryptographic material, and decrypting, decompressing, and authenticating data at the specified location within the archive without requiring the decryption, decompression, and authentication of the entire archive or container.

One embodiment provides a non-transitory machine-readable medium storing instructions which, when executed by one or more processors, cause the one or more processors to perform operations comprising receiving a request to access data at a specified location within an archive, where the archive includes a signed, encrypted, and compressed container, retrieving stored cryptographic material used to unlock and authenticate the container, deriving a multi-level key hierarchy from the stored cryptographic material, and decrypting, decompressing, and authenticating data at the specified location within the archive without requiring decryption, decompression, and authentication of the entire container.

One embodiment provides a data processing system comprising a memory to store instructions and one or more processors to execute instructions stored in memory. The instructions cause the one or more processors to perform operations comprising receiving a request to access data at a specified location within an archive, wherein the archive includes a signed, encrypted, and compressed container, retrieving stored cryptographic material used to unlock and authenticate the container, deriving a multi-level key hierarchy from the stored cryptographic material, and decrypting, decompressing, and authenticating data at the specified location within the archive without requiring decryption, decompression, and authentication of the entire container.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments described herein enable compressed containers that can be decrypted and decompressed in a streaming manner. In one embodiment, a container format for encrypted archives is provided in which data is compressed and encrypted in a segmented manner. Each segment of the archive can be decompressed, decrypted, and checked for integrity without requiring the entire archive to be received.

The following description and drawings are illustrative and are not to be construed as limiting. Various embodiments and aspects will be described with reference to details discussed below, and the accompanying drawings will illustrate the various embodiments. Numerous specific details are described to provide a thorough understanding of various embodiments. However, in certain instances, well-known or conventional details are not described in order to provide a concise discussion of embodiments.

The terminology used in this description is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Some processes are described below in terms of some sequential operations. However, it should be appreciated that some of the operations described may be performed in a different order. Moreover, some operations may be performed in parallel rather than sequentially.

Network Operating Environment and Exemplary Computing Devices

Figure 1:
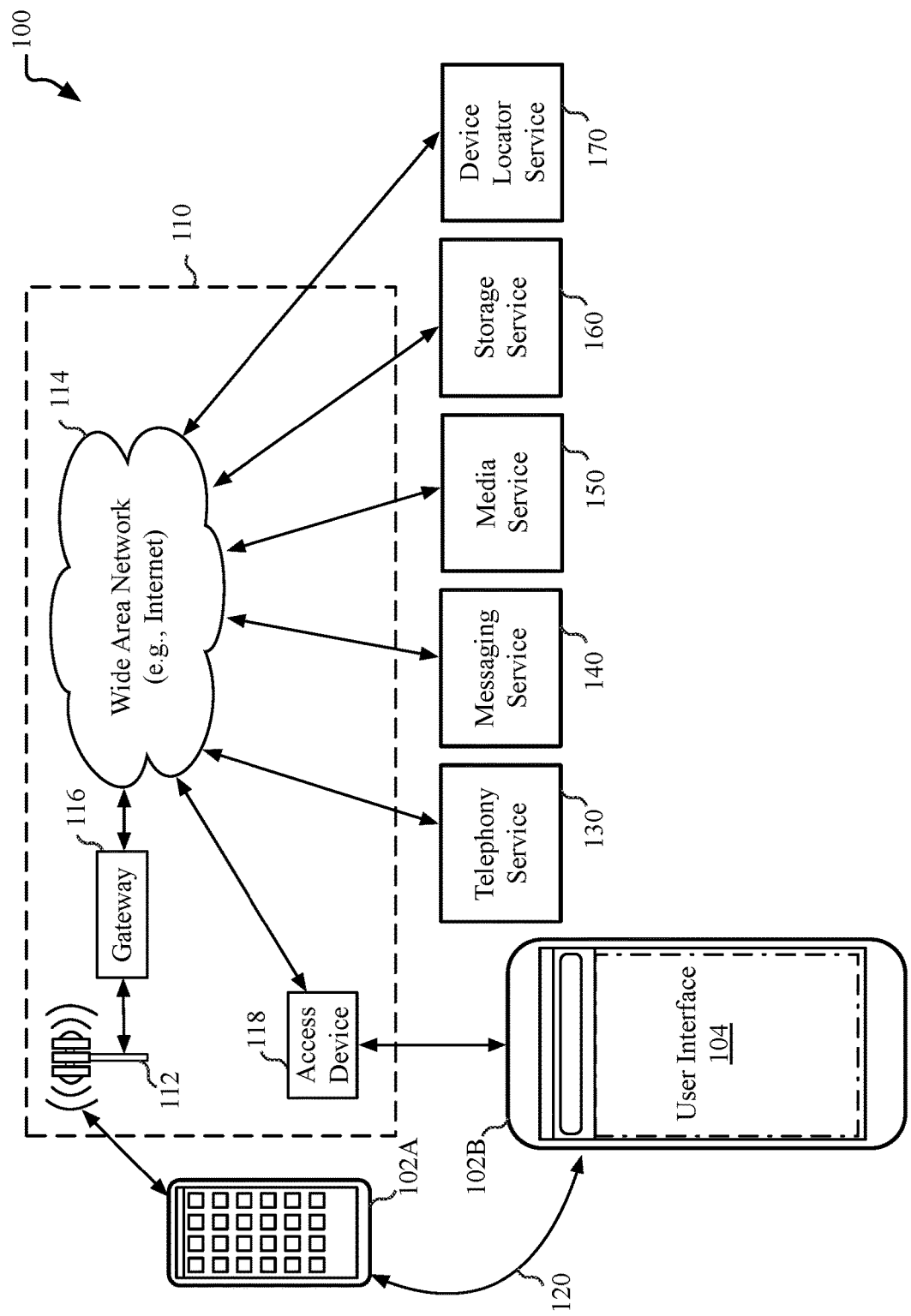
FIG. 1 is a block diagram of a network operating environment for an electronic device.

FIG. 1 is a block diagram of a network operating environment 100 for mobile devices, according to an embodiment. The network operating environment 100 includes multiple mobile devices, such as mobile device 102A and mobile device 102B. The mobile devices 102A-102B can each be any electronic device capable of communicating with a wireless network and one or more wireless accessory devices. Some example mobile devices include but are not limited to a smartphone, a tablet computer, a notebook computer, a wearable computer (e.g., smartwatch or other wearable computing accessory), a mobile media player, a personal digital assistant, and other similar devices. Each of mobile device 102A and mobile device 102B include a user interface, such as user interface 104 of mobile device 102B. Mobile device 102A and mobile device 102B can communicate over one or more wired and/or wireless networks 110 to perform data communication. For example, a wireless network 112 (e.g., cellular network, Wi-Fi network) can communicate with a wide area network 114, such as the Internet, by use of a gateway 116. Likewise, an access device 118, such as a mobile hotspot wireless access device, can provide communication access to the wide area network 114. The gateway 116 and access device 118 can then communicate with the wide area network 114 over a combination of wired and/or wireless networks.

In some implementations, both voice and data communications can be established over the wireless network 112 and/or the access device 118. For example, mobile device 102A can place and receive phone calls (e.g., using VoIP protocols), send and receive e-mail messages (e.g., using POP3 protocol), and retrieve electronic documents and/or streams, such as web pages, photographs, and videos, over the wireless network 112, gateway 116, and wide area network 114 (e.g., using TCP/IP or UDP protocols). In some implementations, mobile device 102A can place and receive phone calls, send and receive e-mail messages, and retrieve electronic documents over the access device 118 and the wide area network 114. In some implementations, mobile device 102A or mobile device 102B can be physically connected to the access device 118 using one or more cables, for example, where the access device 118 is a personal computer. In this configuration, mobile device 102A or mobile device 102B can be referred to as a "tethered" device. In one embodiment, mobile device 102A can communicate with mobile device 102B via a wireless peer-to-peer connection 120. The wireless peer-to-peer connection 120 can be used to synchronize data between the devices.

Mobile device 102A or mobile device 102B can communicate with one or more services, such as a telephony service 130, a messaging service 140, a media service 150, a storage service 160, and a device locator service 170 over the one or more wired and/or wireless networks 110. For example, the telephony service 130 can enable telephonic communication between mobile device 102A and mobile device 102B, or between a mobile device and a wired telephonic device. The telephony service 130 can route voice over IP (VoIP) calls over the wide area network 114 or can access a cellular voice network (e.g., wireless network 112). The messaging service 140 can, for example, provide e-mail and/or other messaging services. The media service 150 can, for example, provide access to media files, such as song files, audio books, movie files, video clips, and other media data. The storage service 160 can provide network storage capabilities to mobile device 102A and mobile device 102B to store documents and media files. The device locator service 170 can enable a user to locate a lost or misplaced device that was, at least at some point, connected to the one or more wired and/or wireless networks 110. For example, mobile device 102A can perform a location query for mobile device 102B. The device locator service 170 can also enable location queries for devices that do not have a network connection via the use of a network of finder devices. Other services can also be provided, including a software update service to update operating system software or client software on the mobile devices. In one embodiment, the messaging service 140, media service 150, storage service 160, and device locator service 170 can each be associated with a cloud service provider, where the various services are facilitated via a cloud services account associated with the mobile devices 102A-102B.

Encrypted and Compressed Container for an Encrypted and Signed Archive

Data that is transmitted to and between the mobile devices 102A-102B via the wide area network 114 can be compressed to reduce the transmission time and network bandwidth consumed when transmitting the data. A signed, encrypted, and compressed container format can be used to enable streaming decryption, decompression, and verification of this content. For example, attachments sent via the messaging service 140 can be compressed and then encrypted using a key known to the recipient.

Figure 2:
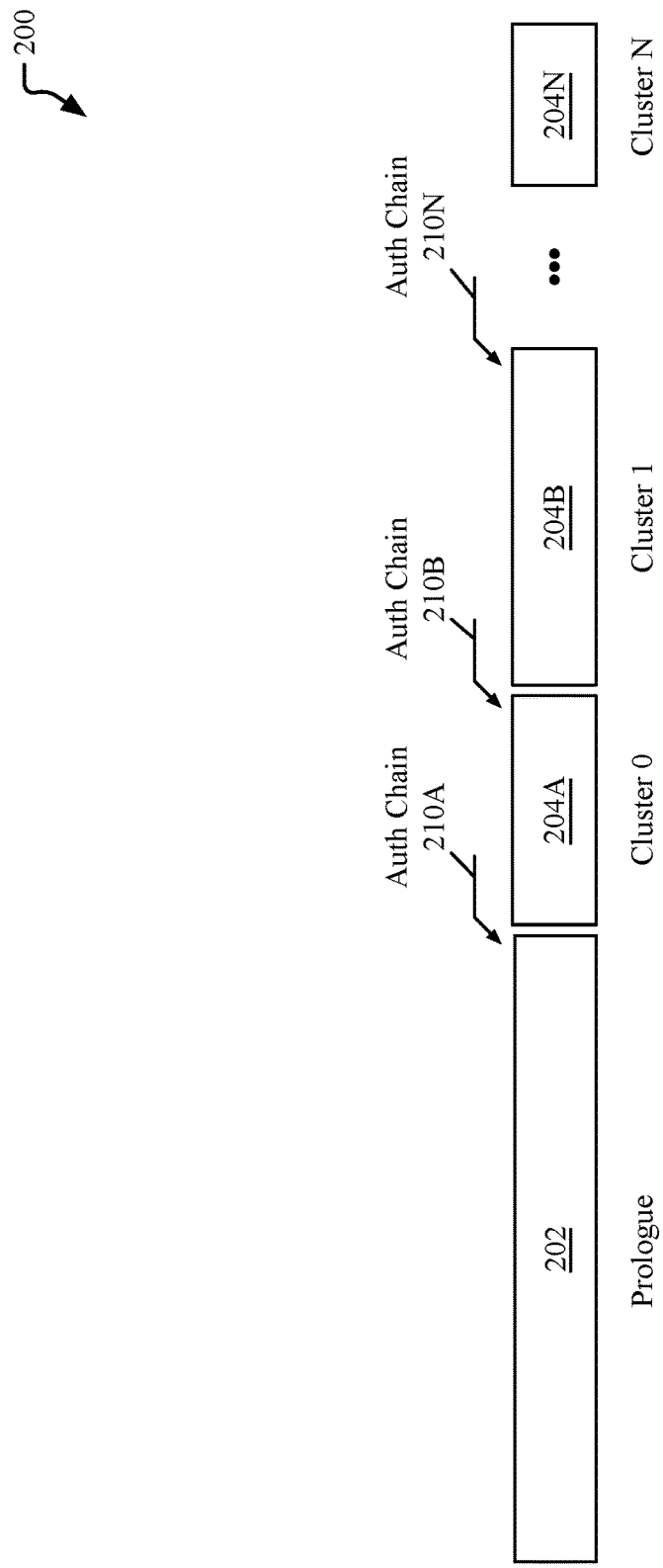
FIG. 2 illustrates an overview of an encrypted archive, according to an embodiment.

FIG. 2 illustrates an overview of an encrypted archive 200, according to an embodiment. The format used for the encrypted archive 200 enables cryptographic features such as authenticated encryption, encrypting to a public key, and/or signatures to be applied to a compressed container. While authenticated encryption, compression, and signatures may be applied, an unencrypted compressed archive may be created that is simply signed by the sender and authenticated by the recipient. Additionally, at least some of the data in an encrypted archive may be uncompressed.

The encrypted archive 200 includes a prologue 202 and one or more clusters 204A-204N. The encrypted archive 200 also includes an authentication chain 210A-210N that enables authentication of the clusters 204A-204N. When all data to be compressed and encrypted is available at the time in which the encrypted archive 200 is created, the archive may contain a single cluster (e.g., cluster 204A). The format of the encrypted archive 200 also allows additional data to be appended to an existing archive without reading and recomputing the authentication tags on existing encrypted and authenticated data. This additional data can be appended as additional clusters (e.g., cluster 204B-204N). Any number of additional clusters can be appended. Additionally, where the encrypted archive is being created in a storage-limited environment, it may be optimal to regularly append smaller amounts of data, rather than storing all of the plaintext data and archiving and encrypting the data at once.

The prologue 202 includes multiple fields that identify the file format of the archive, identify the cipher suite to use to decrypt and/or authenticate the archive, and a combination of variable and fixed size header fields. Header information within the prologue 202 that relates to the data within the encrypted archive is encrypted, limiting the amount of data that can be determined about the encrypted data. In one embodiment, only the file format itself is visible without having the necessary key or password that is used to decrypt the archive. The clusters 204A-204N include independently compressed and encrypted segments of data. Each cluster includes multiple segments, which can be retrieved, decrypted, and verified in parallel or out of sequence. Parallel retrieval, decryption, and decompression can enable higher download speeds under some scenarios. Out of order retrieval, decryption, and decompression enables a media file to be randomly accessed during download or while streaming from a content delivery network.

Figure 3:
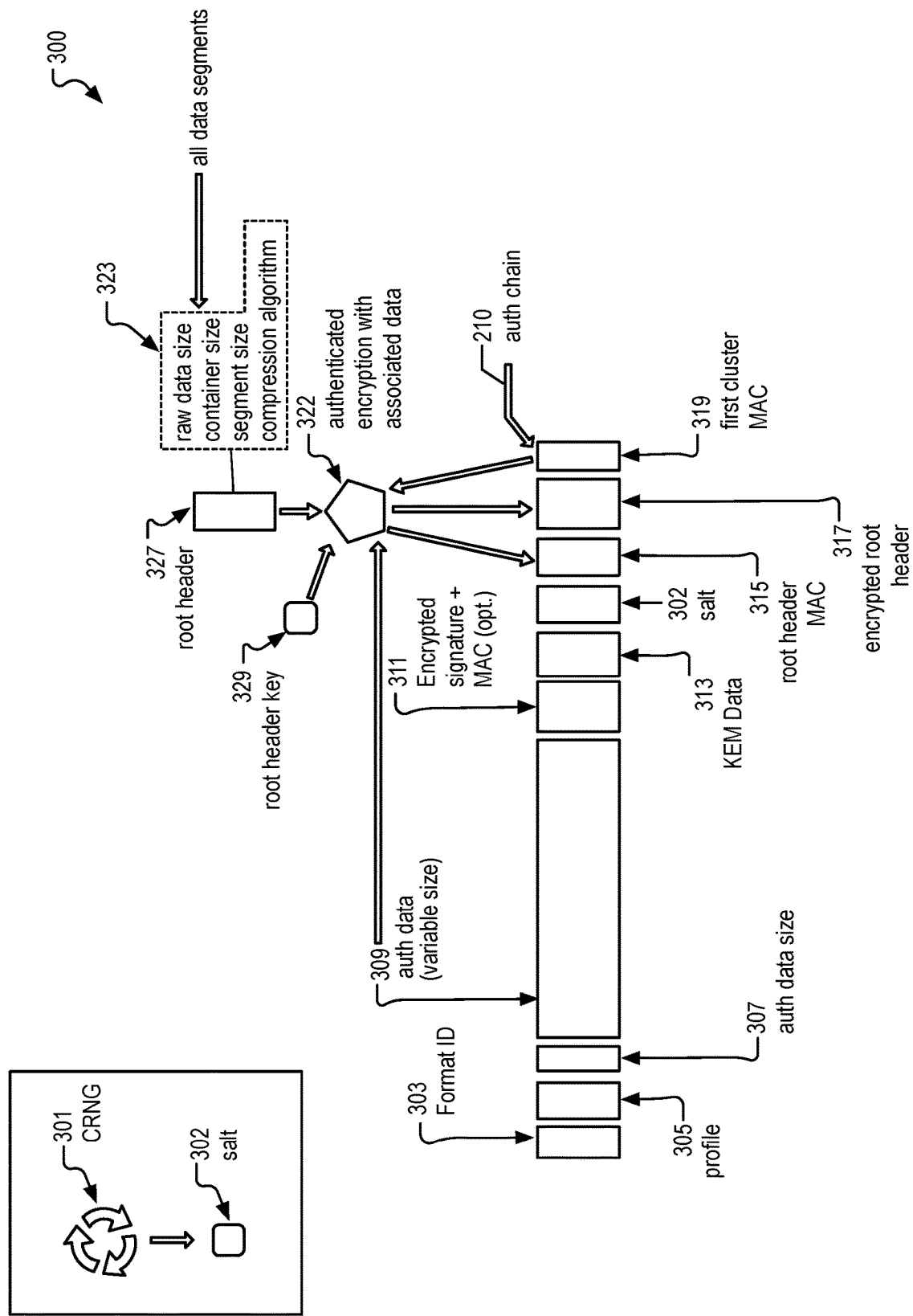
FIG. 3 illustrates a prologue format for an encrypted archive, according to an embodiment.

FIG. 3 illustrates a prologue format 300 for an encrypted archive, according to an embodiment. The prologue format 300 specifies the content of the prologue 202 of an encrypted archive 200 shown in FIG. 2. In one embodiment the prologue format 300 includes fields that specify a format identifier 303, profile 305, authentication data size 307, and authentication data 309. The format ID 303 is a byte sequence that identifies a file as an encrypted archive having the format described herein. In one embodiment the format ID 303 is a four byte number that corresponds with an ASCII string. The profile 305 identifies the ciphersuite to use in order to decrypt and/or authenticate the archive. The authentication data size 307 indicates the size of the authentication data 309, which is variable in size. The authentication data 309 contains information to enable authenticity verification, such as but not limited to an X.509 certificate chain.

The prologue format 300 additionally includes a salt 302, root header message authentication code (MAC) 315, an encrypted root header 317, and a first cluster MAC 319. The prologue format 300 also include optional data, such an encrypted signature and MAC 311 and KEM data 313 that is used for archives that are using a profile that specifies encryption based on a key encapsulation mechanism (KEM). The size and content of the KEM data depends on the profile that is in use. The salt 302 is a random value that is generated via a cryptographic random number generator 301. The salt 302 is used as part of the key derivation process. In one embodiment, the size of the salt 302 varies based on the profile 305 that is in use. In one embodiment the salt 302 is associated with a counter value that is updated when a cluster or segment is modified, although other embodiments exclude the salt counter. The root header MAC 315, along with the head of the cluster chain (e.g., via the first cluster MAC 319) is used to authenticate the root header 327. The first cluster MAC 319 is the head of the authentication chain 210A-210N that is used to authenticate clusters within the cluster chain. In one embodiment, a collision-resistent MAC function is used. The collision-resistant MAC function can be used as an authentication mechanism as well as to detect tampering. Tampering can be detected even in the scenario where the attacker has possession of the archive encryption key.

The root header 327 includes metadata 323 that is derived from all data segments. The metadata 323 included within the root header 327 describes the compressed and encrypted segments. The metadata 323 is encrypted to prevent leakage of information about the data within the archive or the layout of the archive. The metadata 323 includes but is not limited to the raw (uncompressed) data size, the container size, the segment size, and the compression algorithm used to compress the data within the segments. In one embodiment, additional fields of the metadata 323 specifies a padding size and a checksum type. The additional fields of the metadata 323 can also include reserved bits for future use.

The encrypted root header 317 includes encrypted data from the root header 327, as well as the prologue data from the format ID 303 to the salt 302. Authenticated-encryption with associated-data (AEAD) logic 322 is executed by or associated with processing logic of a device that generates the encrypted archive 200. The AEAD logic 322 accepts, as input, the root header 327, a root header key 329, the authentication data 309, and the first cluster MAC 319 and outputs the encrypted root header 317 and the root header MAC 315. In one embodiment, the AEAD logic 322 uses collision resistant hash functions.

Figure 4:
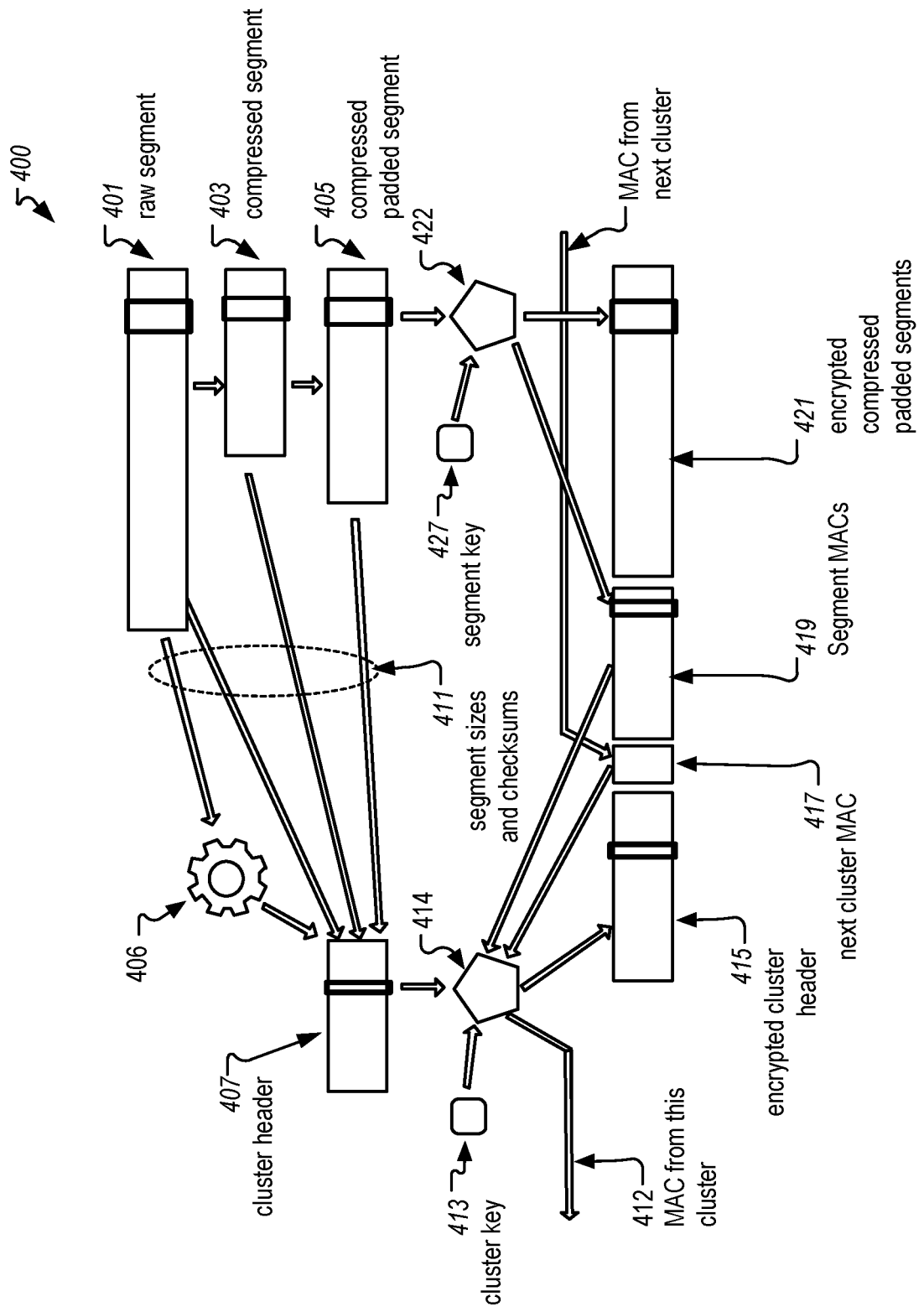
FIG. 4 illustrates a cluster format for an encrypted archive, according to an embodiment.

FIG. 4 illustrates a cluster format 400 for an encrypted archive, according to an embodiment. With brief reference to FIG. 2, the compressed and/or encrypted data payload of the encrypted archive 200 is appended after the prologue 202 as data segments within one or more clusters 204A-204N. As shown in FIG. 4, the cluster format 400 includes an encrypted cluster header 415, the next cluster MAC 417, the segment MACs 419, and a set of encrypted, compressed, and/or padded segments 421.

A cluster can store in a raw segments 401, compressed segments 403, or compressed and padded 405 segments. In some embodiments, padding can be applied in an archive specific manner, rather than a segment specific manner. In such embodiments, the compressed and padded 405 segments may be excluded. If compression is enabled for the archive, each raw segment 401 is compressed using compression logic 406. Optionally, a raw segment 401 can be compressed into a compressed and padded segment 405. Padding may be used to enhance security by obscuring the true segment size of the data. Segment metadata 411 including segment sizes and checksums can be stored to a cluster header 407, which contains information about the cluster. Segment size for an archive can be chosen based on the impact of the segment size on compression efficiency for the underlying data. The type of the checksum can vary and can be specified in the root header of the archive. The cluster header 407 is encrypted into the encrypted cluster header 415 using AEAD logic 414 based on a cluster key 413, with the segment MACs 419 and next cluster MAC 417 used as the associated data. The current cluster MAC 412 is stored in the previous segment, or in the prologue as the first cluster MAC 319, as shown in FIG. 3.

Each segment is compressed independently. In one embodiment each segment is also encrypted individually. AEAD logic 422 can be used to encrypt a raw segment 401, compressed segment 403, or compressed and padded segment 405 using a segment key 427. In one embodiment the segment key 427 is derived from the cluster key 413. In one embodiment, no associated data is input to AEAD logic 422 when encrypting segments, as cluster data is authenticated using the cluster key 413. In other embodiments, at least a portion of the data for the cluster can be supplied to AEAD logic 422 as associated data and authenticated using the segment key 427.

For random or parallel retrieval of segments from a remote location, specific segments and associated MACs can be retrieved. Individual segments within a cluster can be retrieved from the encrypted, compressed, and/or padded segments 421 using the offset of the segment within the cluster, which can be computed based on metadata stored in the encrypted cluster header 415. A retrieved cluster can be decrypted and verified using the MAC for the segment that is stored in the segment MACs 419.

Figure 5:
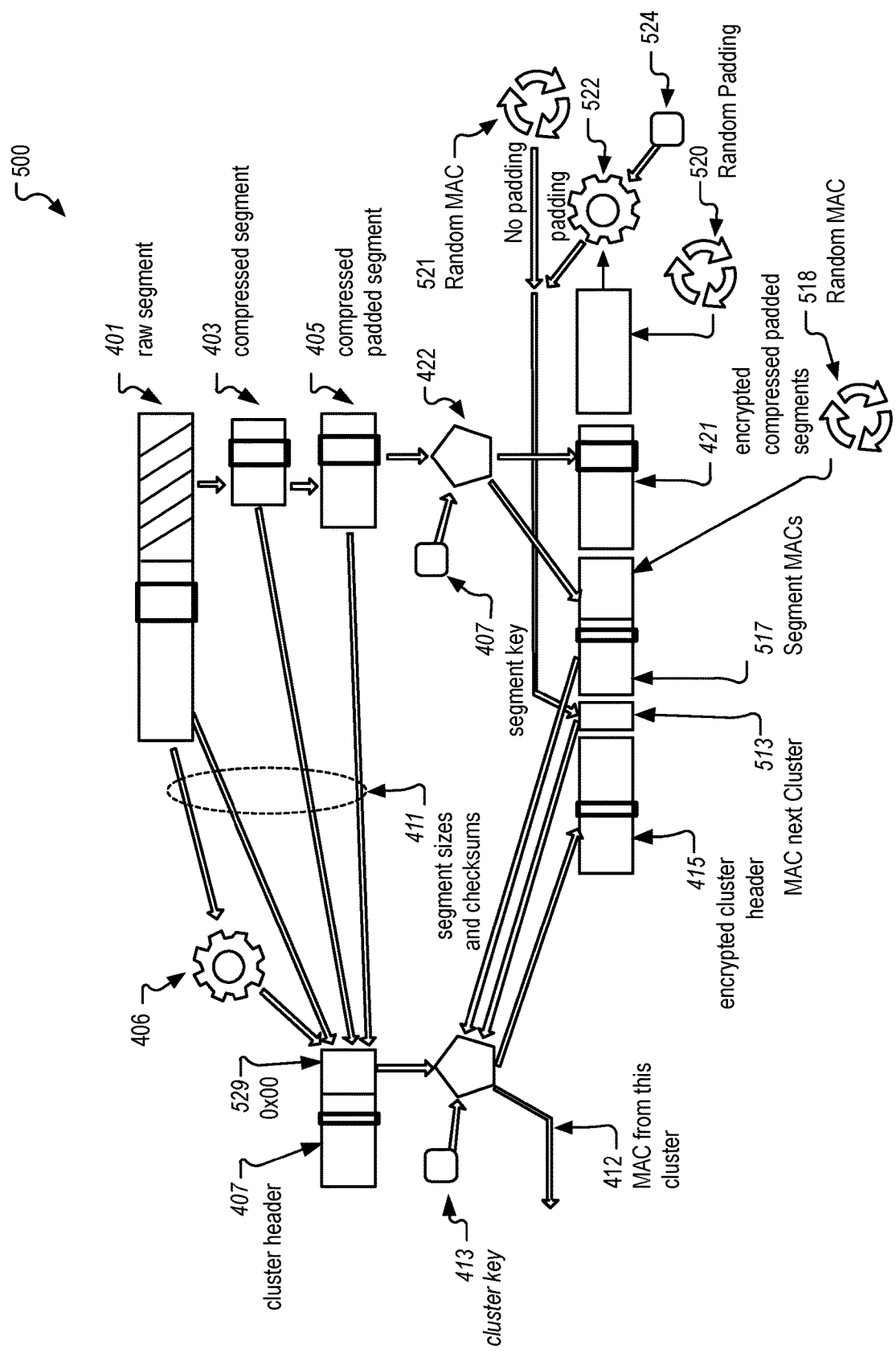
FIG. 5 illustrates a last cluster format, according to an embodiment.

FIG. 5 illustrates a last cluster format 500, according to an embodiment. Most aspects of the last cluster format 500 are consistent with the cluster format 400 of FIG. 4. Where an archive has multiple clusters, the last cluster of an archive may differ from the other clusters in the archive. Some aspects of the last cluster format 500 also apply to single cluster archives. The last cluster of an encrypted archive does not have a next cluster. The next cluster MAC 513 may be a randomly generated MAC 521 that is generated by a cryptographic random number generator. Additionally, where cluster size (e.g., number of segments) is configured to be consistent for each cluster, some segments of an appended cluster may be empty. For empty segments, a portion 529 of the cluster header 407 may contain randomly generated checksums. A random MAC 518 may also be used for a portion of the segment MACs 517 that corresponds with empty data.

In one embodiment, a random padding 520 can be added to the last cluster of an archive. When random padding 520 is added, the next cluster MAC 513 can be used to authenticate the padding. A cryptographic function 522 can be used to generate a MAC based on the random padding 520 and a padding authentication key 524. When an archive is opened and not yet finalized, new data may be appended to the archive by adding new data to the end, appending new clusters if necessary. If a cluster is no longer the last cluster due to a newly appended cluster, the format of the cluster is adjusted from the last cluster format 500 to the cluster format 400 of FIG. 4. In one embodiment, once an encrypted archive is finalized, data may be added to a cluster by opening the archive, rotating the salt used for key derivation (e.g., salt 302 of FIG. 3), and re-encrypting the data and headers of the archive using the new keys derived from the rotated salt.

Cryptographic operations used generate an encrypted archive are described below. A key derivation hierarchy can be used derive a variety of cryptographic keys that are used to encrypt and decrypt header, cluster, and segment data. Different profiles can be used that specify details of the ciphersuite, encryption modes, and signature modes that are used when generating an encrypted archive.

Key Hierarchy and Key Derivation

Figure 6:
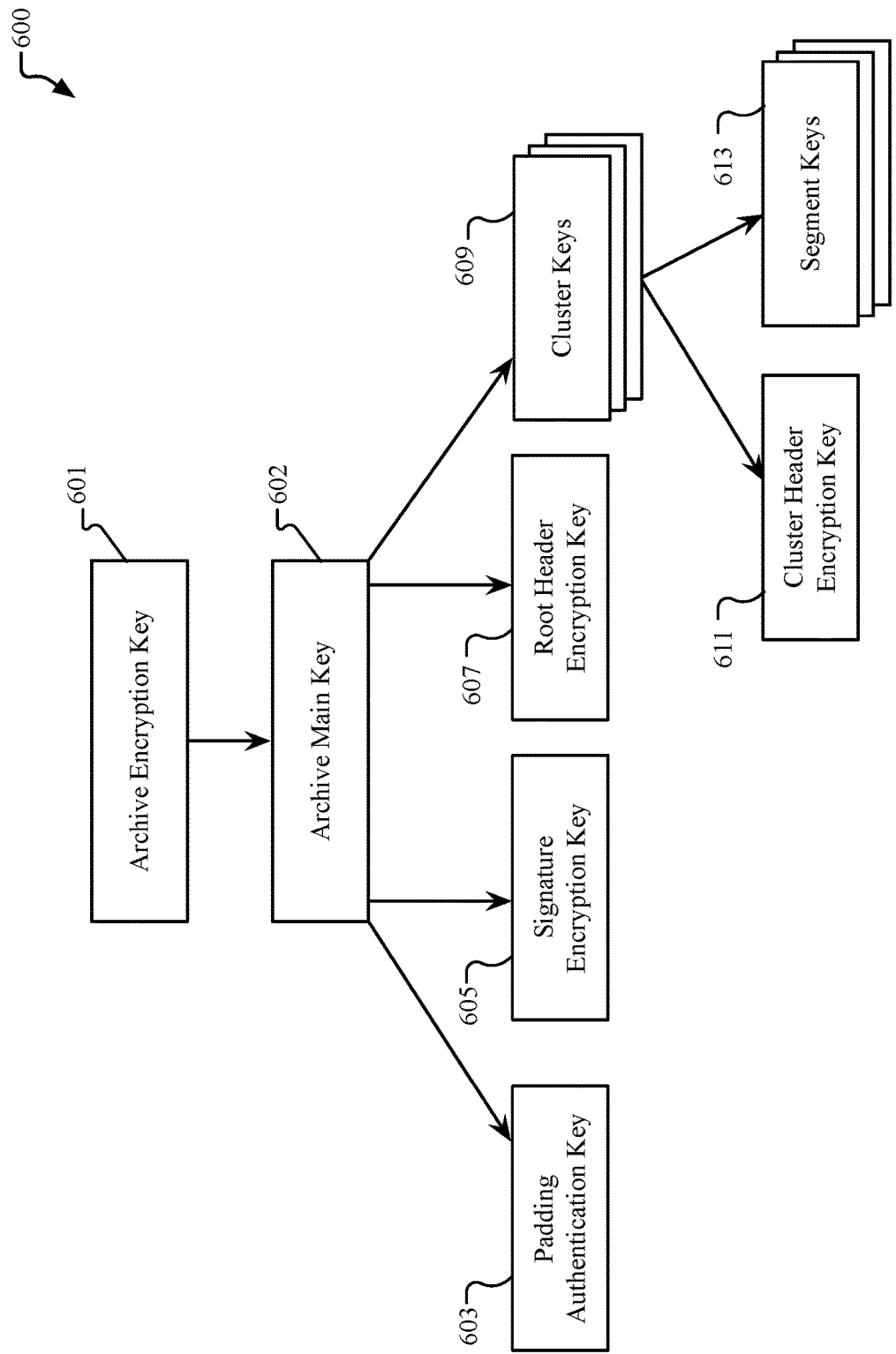
FIG. 6 illustrates a key derivation hierarchy for an encrypted archive.

FIG. 6 illustrates a key derivation hierarchy 600 for an encrypted archive. Key derivations can be performed using a key derivation function KDF, where Output Key Material=KDF (Input Key Material, Salt, Info). The specific key derivation function can vary based on the cryptosystem of the selected profile. The length of the output key material can also vary based on the selected profile. The key derivation hierarchy includes an archive encryption key 601. In one embodiment, the archive encryption key 601 is a high entropy symmetric secret. The archive encryption key 601, along with profile information of the encrypted archive and the salt, is used to derive an archive main key 602. The archive main key 602 is used to derive a padding authentication key 603, signature encryption key 605, a root header encryption key 607, and a set of cluster keys 609. The padding authentication key 603 is used to authenticate padding that is appended to the end of the archive when archive padding is enabled. The signature encryption key 605 is used to encrypt a signature for the encrypted archive when signatures are enabled. The root header encryption key is used to encrypt metadata within the root header of the archive. The cluster keys 609 are used to derive a cluster header encryption key 611 and segment keys 613 for use within the respective clusters. The cluster header encryption key 611 is used to encrypt cluster specific metadata. The segment keys 613 are used to encrypt specific segments.

Figure 7:
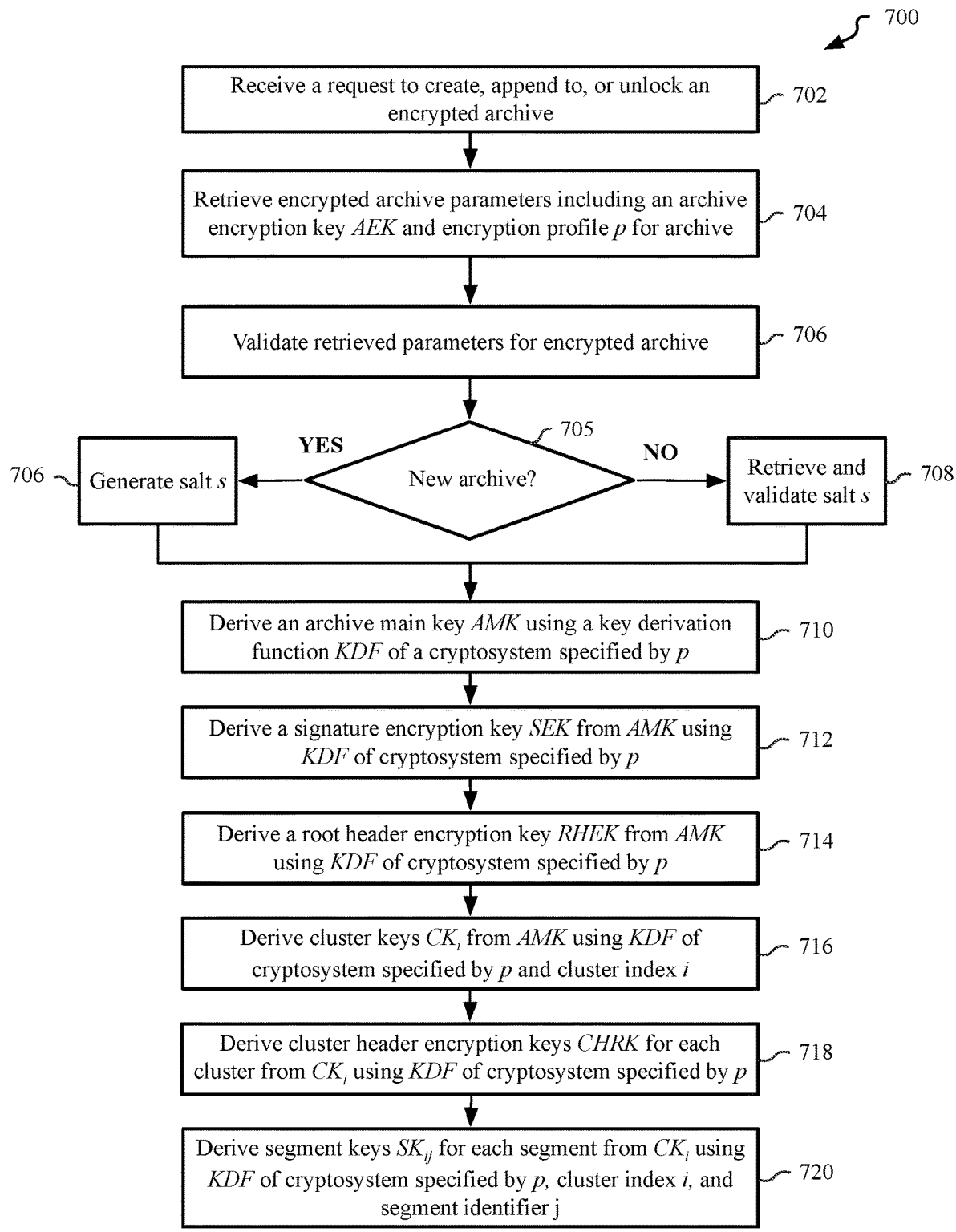
FIG. 7 illustrates a method to derive the cryptographic material used to create an encrypted archive.

FIG. 7 illustrates a method 700 to derive the cryptographic material used to create and access encrypted archive. Method 700 can be performed by software logic executed by processors of a computing device that is used to create or access a signed, encrypted, and compressed container in the form of a signed, encrypted, and/or compressed archive described herein (e.g., encrypted archive 200 of FIG. 2). Method 700 can be performed by a computing device that is used to create and/or deploy content (e.g., media, software, etc.) to a server or content delivery network. Method 700 can also be performed by a computing device to compress and encrypt local data, such as files or folders that will be stored locally to the computing device, to a file server on a network that is local to the computing device, on a remote server, or a cloud storage service. Method 700 can also be performed to unlock an encrypted archive at a recipient device and/or access data within an unlocked archive.

According to method 700, a computing device can receive a request to create or append to an encrypted archive (702). The computing device can then retrieve encrypted archive parameters including an archive encryption key AEK and encryption profile p for archive (704). The AEK is a secret that is shared between the creator an encrypted archive and the intended recipient of the archive. The AEK may be shared out-of-band between the creator and the recipient and no specific key distribution system is mandated. The AEK may be stored to a shared keychain for content that is to be accessible for all devices that are associated with a single account. The AEK may also be transmitted over a previously established secure encryption channel between the sender and recipient. Encryption profile p specifies configuration parameters for generating and decrypting an encrypted archive. Encryption profile p be in the form of a data structure that is generated by the sender/creator and stored in the prologue of the archive (e.g., profile 305 as in FIG. 3). Additionally, encryption profile p may be transmitted out-of-band to the recipient/consumer or may be pre-determined or negotiated between the sender/creator and recipient/consumer of the archive.

According to method 700, the computing device can then validate the retrieved parameters for encrypted archive (705). Validating the retrieved parameters can include matching the size of the AEK with the encryption key size specified by encryption profile p. When creating a new archive (705, YES), the computing device can then generate a new salt s, where salt s is a random value that is generated via a cryptographic random number generator (706). When unlocking an existing archive (705, NO), the computing device can retrieve salt s (e.g., salt 302 of FIG. 3) from the prologue of the archive and validate the size of salts relative to the size specified by encryption profile p (708). Additionally, when unlocking an existing archive, encryption profile p stored in the archive is validated to determine if the stored profile matches the expected profile and/or the profile passed via the API command used to unlock the archive.

Method 700 additionally includes key derivation operations to derive the set of keys to use to generate the archive from the AEK. In one embodiment, keys can be derived from the AEK according to the key derivation hierarchy 600 of FIG. 6, although other embodiments may use a different key hierarchy. The computing device can derive an archive main key AMK using a key derivation function KDF of a cryptosystem specified by encryption profile p (710). Using the KDF specified by the profile, AMK can be derived by:

AMK=KDF (AEK, s, ASCII ("AES_AMK")$\|P_{Info}$).

$P_{Info}$ is profile specific information that is appended to the input to the KDF. In one embodiment, $P_{Info}$ includes a profile value, which is a data value that is associated with or used to identify the profile. When a public key is used, an ephemeral public key of the sender and the public key of the recipient is included. If the profile specifies the use of a signature, the signing public key of the sender is also included. Including the signing public key of the sender protect against signature stripping and re-signing attacks by cryptographically associating the profile specific information and the signing public key of the sender with the derivation process of the AMK.

The remaining keys are derived based on the AMK. A portion of the output of the KDF of when generating derivative keys of the AMK can be used as the initialization vector (IV) for cryptographic operations using the respective derivative key. In one embodiment, random IVs can be generated and stored per segment and headers instead of using a portion of the output of the KDF. The computing device can derive a signature encryption key SEK from AMK using KDF of the cryptosystem specified by p (712). The computing device can derive a root header encryption key RHEK from AMK using KDF of the cryptosystem specified by p (714). The computing device can derive cluster keys $CK_i$ from AMK using KDF of the cryptosystem specified by p and cluster index i (716). Accordingly, each cluster has a different key. The computing device can derive cluster header encryption keys CHEK for each cluster from $CK_i$ using KDF of the cryptosystem specified by p (718). As the CHEK is derived from the cluster specific key, the CHEK of each cluster will be different. The computing device can derive segment keys $SK_{ij}$ for each segment from $CK_i$ using KDF of the cryptosystem specified by p, cluster index i, and segment identifier j (720). As the segment keys are derived from the cluster specific key, the segment key for a given segment identifier j will differ from the segment key for segment identifier j of a different cluster. In one embodiment, where random padding is to be added to the end of the archive, a padding authentication key PEK can be derived based on the AMK using the KDF of the cryptosystem specified by p.

It will be noted that, when the use of signatures is enabled, the SEK is used to encrypt the signature. The SEK is derived from the AMK. Accordingly, the AMK has to be known to derive the SEK, as only a possessor of the AMK can validly derive the SEK and encrypt a signature. In one embodiment an archive can be finalized and signed by a signing service without providing the signing service access to the keys used to generate the SEK. Instead, the SEK is derived by the creator and passed to the signing service. The signing service can then append the encrypted signature without requiring the signing service to have access to key material that is used to access the contents of the archive. Encrypting signatures using the SEK maintains signature privacy (e.g., "signature hiding") for an archive stored on an content delivery network. An attacker that has full knowledge of the key directory of the content delivery network will not be able to determine the identity of the sender of an archive without also having access to the SEK.

Encryption and Decryption

Encryption and decryption are performed using the key hierarchy derived using method 700 of FIG. 7. When encryption is disabled, a NULL cypher is used for encryption, but sender authentication may still be enabled for the archive.

Figure 8:
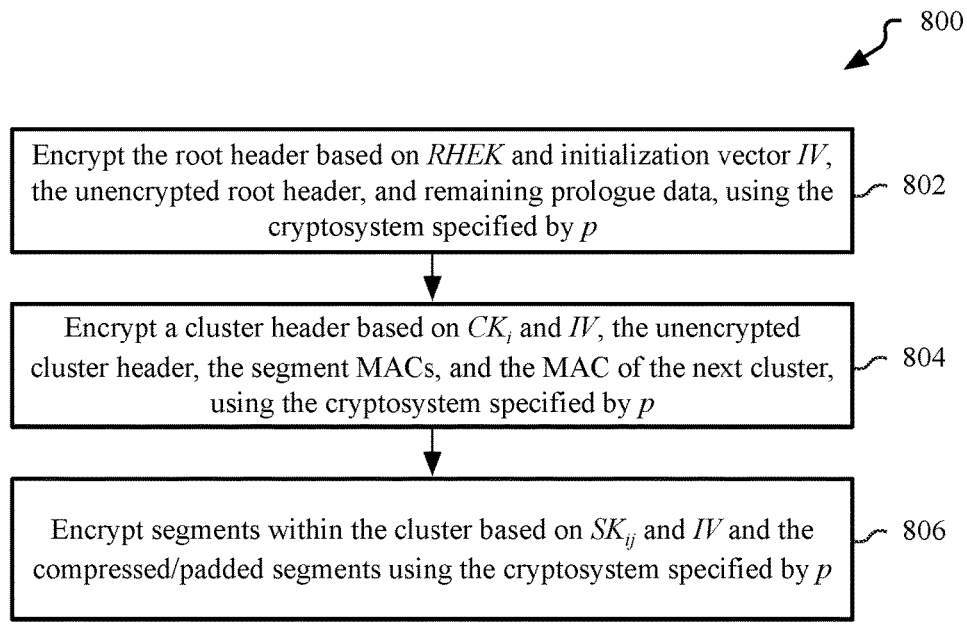
FIG. 8 illustrates a method to encrypt data of an encrypted archive.

FIG. 8 illustrates a method 800 to encrypt data of an encrypted archive. Method 800 can be performed by an electronic device that is used to create an encrypted archive as described herein. A portion of method 800 is performed by an electronic device when new data is added to an archive.

According to method 800, a computing device can perform operations to encrypt the root header based on the RHEK and initialization vector IV, the unencrypted root header, and remaining prologue data, using the cryptosystem specified by p (802). In one embodiment, the encrypted root header ERH and root header RH MAC is output from the encryption, such that the encrypted root header ERH and root header MAC are generated as:

(ERH, RH MAC)=AEAD (RHEK, IV, Root Header, profile$\|$AuthData$\|$public key$\|$salt).

The computing device can perform operations to encrypt a cluster header based on $CK_i$ and IV, the unencrypted cluster header, the segment MACs, and the MAC of the next cluster, using the cryptosystem specified by p (804). Encrypted cluster header ECH and cluster MAC is generated as:

(ECH, Cluster MAC)=AEAD ($CK_i$, IV, Cluster Header, segment MACs||Next Cluster MAC).

The computing device can perform operations to encrypt segment $S_j$ in cluster $C_i$ based on $SK_{ij}$ and IV and the compressed/padded segments using the cryptosystem specified by p (806). Encrypted segment $S_{ij}$ and associated MAC are generated as:

($ES_{ij}$, Segment MAC)=AEAD ($SK_{ij}$, IV, compressed/padded segment, NULL).

When random padding bytes are added to the end of an archive, a padding MAC can be generated as Padding MAC=MAC(PAK, Padding Bytes).

Figure 9:
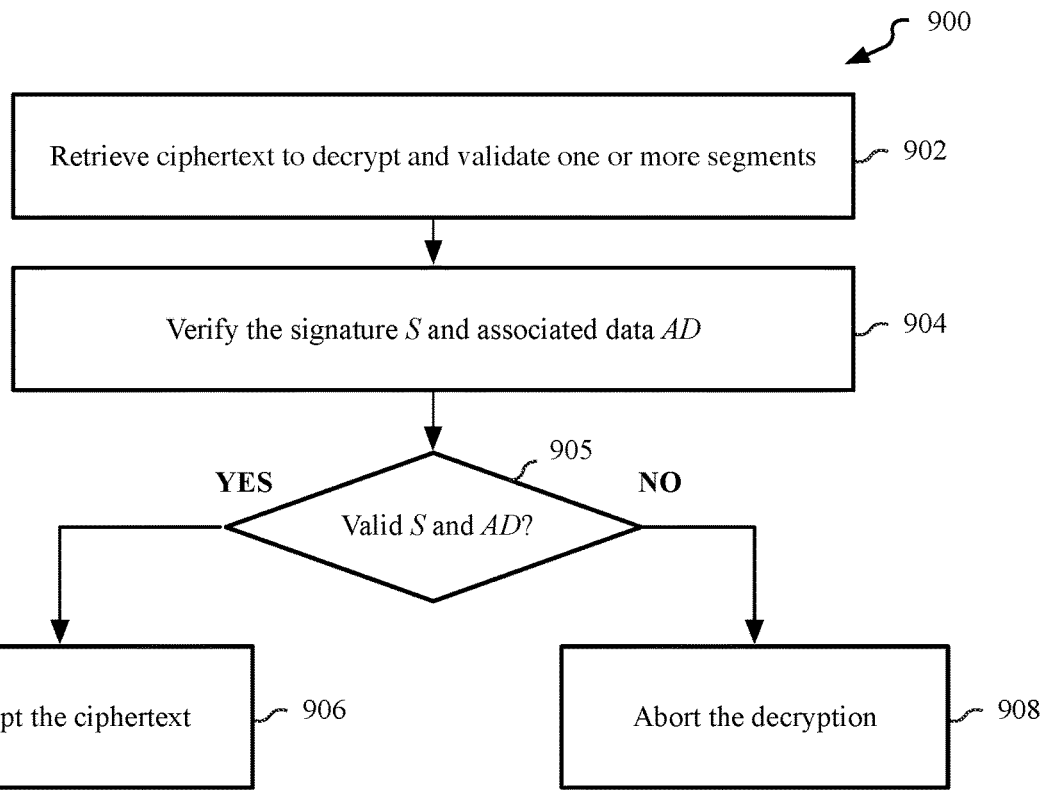
FIG. 9 illustrates a method to decrypt and/or authenticate data of an encrypted archive.

FIG. 9 illustrates a method 900 to decrypt and/or authenticate data of an encrypted archive. A computing device can retrieve ciphertext to decrypt and validate one or more segments (902). The ciphertext include encrypted segments and the headers associated with the encrypted data. Other information, such as the profile, salt, etc., can also be read from the archive. The computing device can then verify the signature and associated data of the encrypted archive (904) to determine if the signatures and associated data are valid (905). The signature is verified using a key associated with the sender/creator of the archive. The signature verification key is different from the SEK. The sender/creator of the archive and legitimate recipients can exchange the signature verification key out-of-band of the encrypted archive API. In one embodiment the signature verification key can be derived from a signing public key of the sender/creator of the archive. If the signature and associated data are valid (905, YES), the computing device can decrypt the ciphertext of the archive (906). If the signature and associated data are invalid (905, NO), the computing device will abort the decryption (908).

Figure 10:
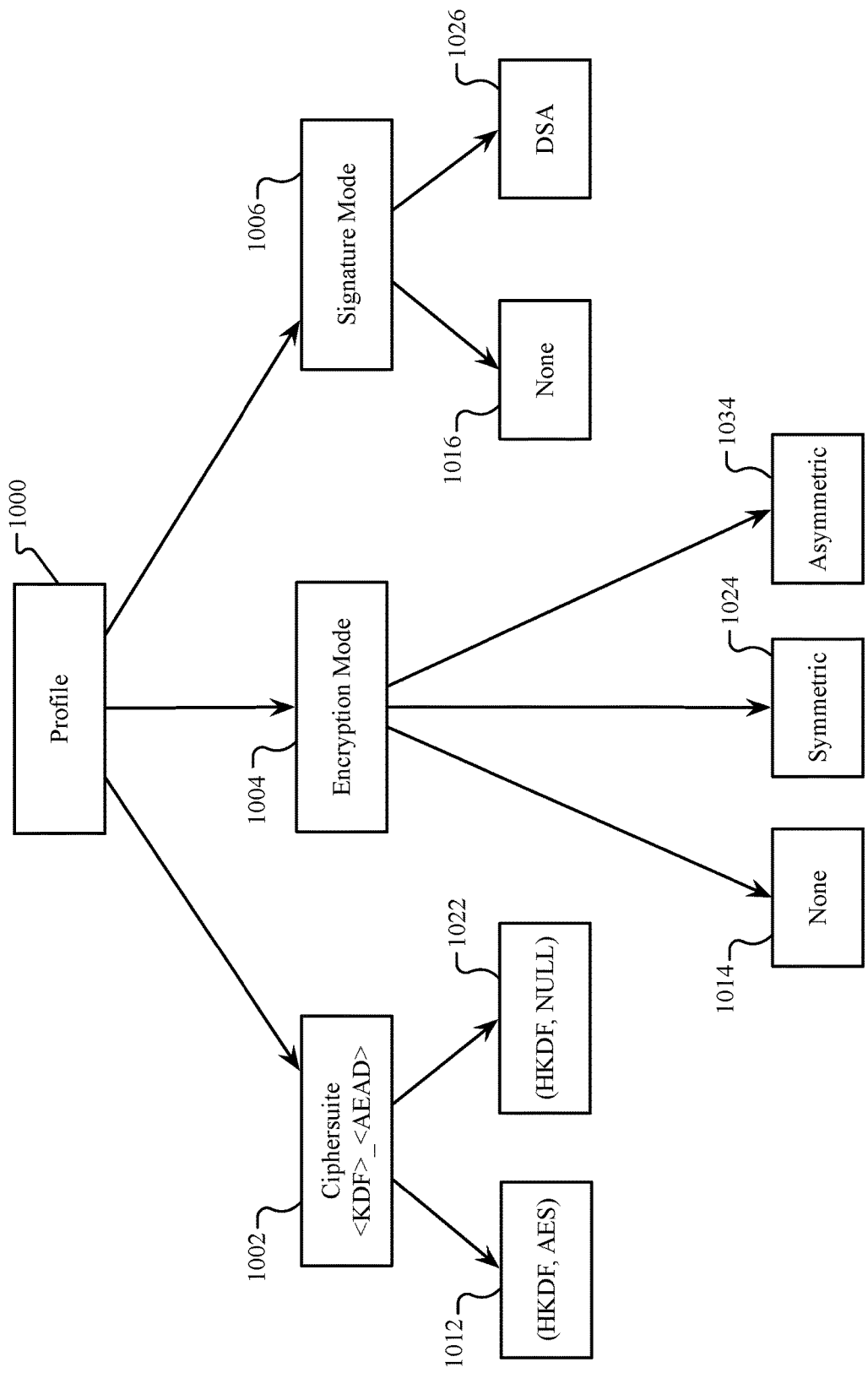
FIG. 10 illustrates a profile details for an encrypted archive.

FIG. 10 illustrates a details of the profile 1000 used for an encrypted archive. The profile 1000 can specify a ciphersuite 1002, encryption mode 1004, and signature mode 1006. In one embodiment the ciphersuite 1002 is a tuple that specifies a key derivation function KDF and an algorithm to use for AEAD.

In one embodiment the ciphersuite 1002 can specify a tuple 1012 including a hash-based message authentication code (HMAC) based key derivation function HKDF and an encryption algorithm, such as a specified version of the advanced encryption standard (AES) algorithm. When no encryption is used, the tuple 1022 specifies an HKDF and a NULL encryption algorithm which does not actually encrypt the plaintext. The encryption mode 1004 can be set to none 1014, symmetric key encryption 1024, or asymmetric encryption 1034 (e.g., public/private key encryption). Tuple 1022 is used for the ciphersuite 1002 when the encryption profile is set to none 1014. However, authentication is performed even when encryption is disabled.

When the encryption mode 1004 is set to symmetric key encryption 1024, the AEK is directly provided when creating or opening/unlocking an archive. The AEK may be exchanged between the creator and a recipient of an archive out-of-band of the encrypted archive API. When the encryption mode 1004 is set to asymmetric encryption 1034, the AEK is obtained based on a key pair. The creator of the archive generates an ephemeral key pair and includes the public key in the prologue of the archive. In one embodiment, the AEK is obtained using a key encapsulation mechanism (KEM), such as, but not limited to non-interactive static-ephemeral Diffie-Hellman Key Exchange. Other key encapsulation mechanisms are used in other embodiments. The signature mode 1006 can specify no signature 1016 or specify a digital signature algorithm 1026 for use. The encryption mode 1004 and signature mode 1006 can specify the use of elliptic curve algorithms (e.g., ECDHE for asymmetric encryption 1034, ECDSA for the digital signature algorithm 1026). A value or data structure that identifies or specifies the specific configuration of the profile 1000 that is used to generate an archive is stored in the prologue of the archive and supplied as input to one or more KDF and/or AEAD operations described herein.

Figure 11:
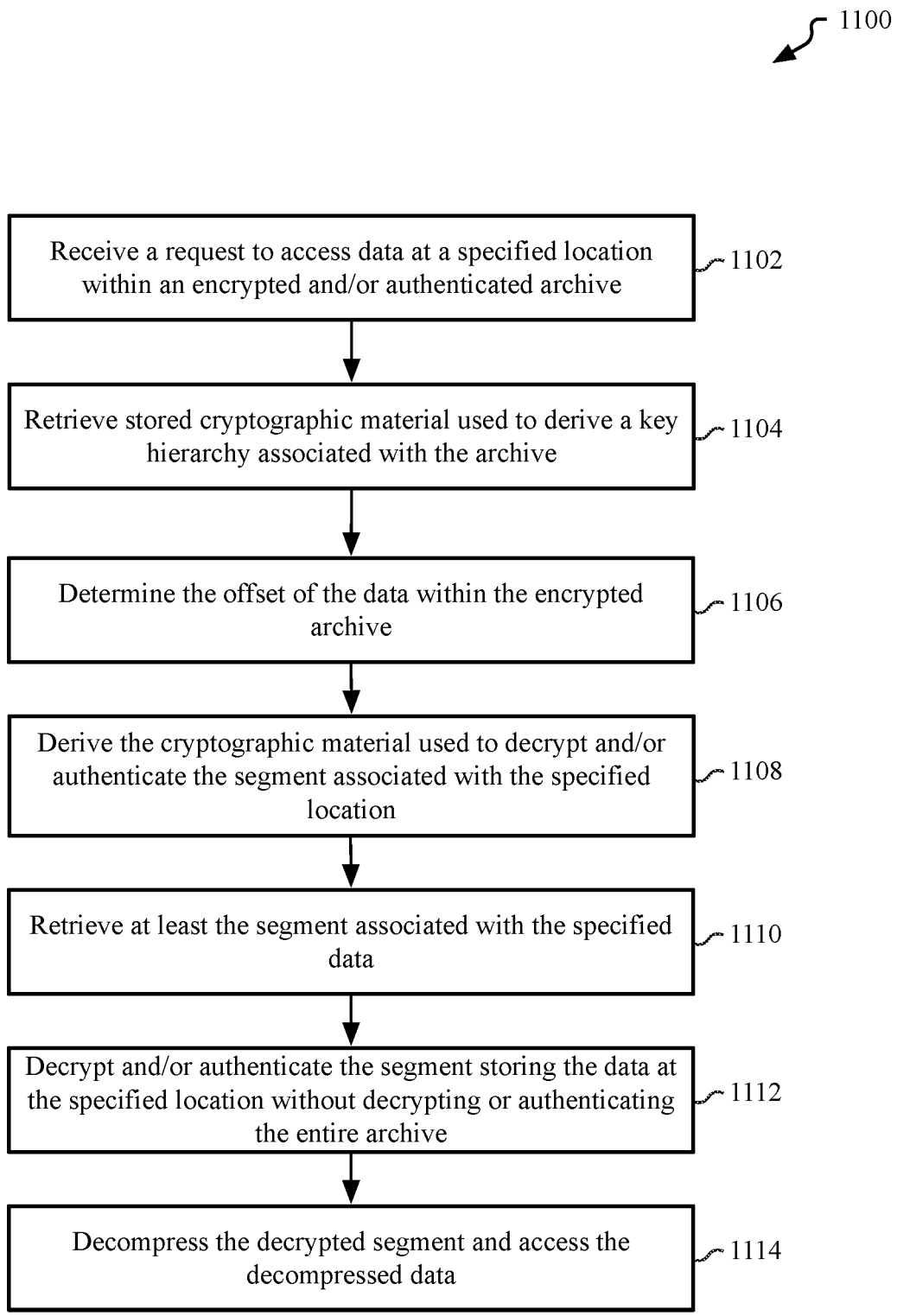
FIG. 11 illustrates a method for random access to data within an encrypted archive.

FIG. 11 illustrates a method 1100 to perform random access to data within an encrypted archive. Once key material to decrypt and authenticate an archive is generated by a recipient, specific segments can be decrypted, authenticated, and/or decompressed individually and in any order. Multiple segments can also be retrieved in parallel over a network using multiple network data streams. Method 1100 can be performed by hardware and software logic of a computing device that has access to content, such as but not limited to software, media, or electronic books.

According to method 1100, a computing device can receive a request to access data at a specified location within an encrypted and/or authenticated archive (1102). The request can be associated with, for example, playback of a media file on the computing device, where the media file is stored locally on the computing device or on a remote server. Data for the media can be streamed directly from the archive once the archive is unlocked. To unlock the archive, the computing device retrieves stored cryptographic material used to derive a key hierarchy associated with the archive (1104). The key hierarchy may be a multi-level key hierarchy as shown in FIG. 6. In various embodiments, the stored cryptographic material includes the AEK, a key pair that is used to generate the AEK, or an AMK derived from the AEK.

The computing device can then determine the offset of the data within the encrypted archive (1106). The offset of the data within the encrypted archive can be associated with, for example, a filename, address offset, or a timestamp within a media file. The computing device can derive the cryptographic material used to decrypt and/or authenticate the segment, segments, or cluster associated with the specified location (1108). Alternatively, the computing device can derive all cryptographic material for an archive in association with accessing the archive, receiving the archive, or in response to receipt of key material for the archive from the sender or provider of the archive. Derivation can be performed according to method 700 of FIG. 7.

Having the cryptographic material to unlock the archive, the computing device can retrieve at least the segment associated with the specified location within the archive (1110). Metadata for the segment that stored in the root header and cluster header for the cluster that contains the segment is also retrieved if not already stored locally or in memory of the computing device. The computing device can decrypt and/or authenticate the segment storing the data at the specified location of content without decrypting or authenticating the entire archive (1112). Authentication can be performed at least in part before decryption. For example, decryption and/or authentication can be performed according to method 900 of FIG. 9, in which a signature and associated data are authenticated before decryption. Further authentication can be performed after data is decrypted. For example, the associated data for a header can includes MACs, checksums, or certificates for use in authenticating a sender and/or data of the archive.

When the decrypted data for a segment is in a compressed format, the computing device can then decompress the decrypted segment and access the decompressed data (1114). In some implementations, the archive may be required to be unlocked to access metadata within encrypted headers before the specific segment in which the desired data may be determined. However, segments may be accessed individually without requiring the entire archive or cluster to be decrypted.

In one embodiment, an API is provided by an operating system of a computing device to enable the functionality described herein to be accessed by applications that execute on the computing device. Exemplary services and API implementing components are described below.

Exemplary API and Data Processing Systems

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embedment, call APIs from different providers such as a set of APIs from an OS provider and another set of APIs from a plug-in provider and another set of APIs from another provider (e.g., the provider of a software library) or creator of the another set of APIs.

Figure 12:
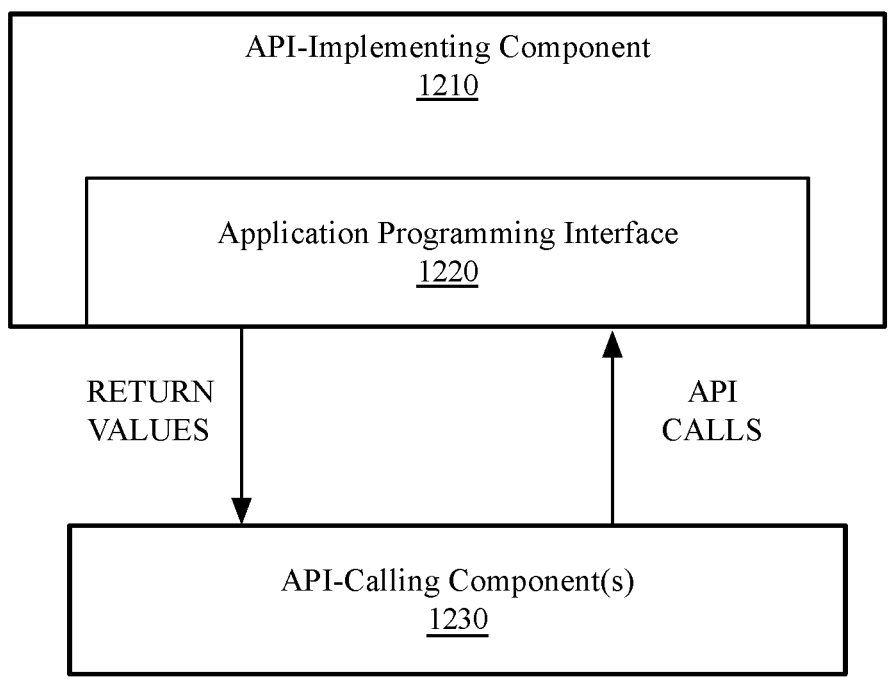
FIG. 12 is a block diagram illustrating an exemplary API architecture, which may be used in some embodiments of the invention.

FIG. 12 is a block diagram illustrating an exemplary API architecture, which may be used in some embodiments of the invention. As shown in FIG. 12, the API architecture 1200 includes the API-implementing component 1210 (e.g., an operating system, a library, a device driver, an API, an application program, software or other module) that implements the API 1220. The API 1220 specifies one or more functions, methods, classes, objects, protocols, data structures, formats and/or other features of the API-implementing component that may be used by the API-calling component 1230. The API 1220 can specify at least one calling convention that specifies how a function in the API-implementing component receives parameters from the API-calling component and how the function returns a result to the API-calling component. The API-calling component 1230 (e.g., an operating system, a library, a device driver, an API, an application program, software or other module), makes API calls through the API 1220 to access and use the features of the API-implementing component 1210 that are specified by the API 1220. The API-implementing component 1210 may return a value through the API 1220 to the API-calling component 1230 in response to an API call.

It will be appreciated that the API-implementing component 1210 may include additional functions, methods, classes, data structures, and/or other features that are not specified through the API 1220 and are not available to the API-calling component 1230. It should be understood that the API-calling component 1230 may be on the same system as the API-implementing component 1210 or may be located remotely and accesses the API-implementing component 1210 using the API 1220 over a network. While FIG. 12 illustrates a single API-calling component 1230 interacting with the API 1220, it should be understood that other API-calling components, which may be written in different languages (or the same language) than the API-calling component 1230, may use the API 1220.

The API-implementing component 1210, the API 1220, and the API-calling component 1230 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 13A:
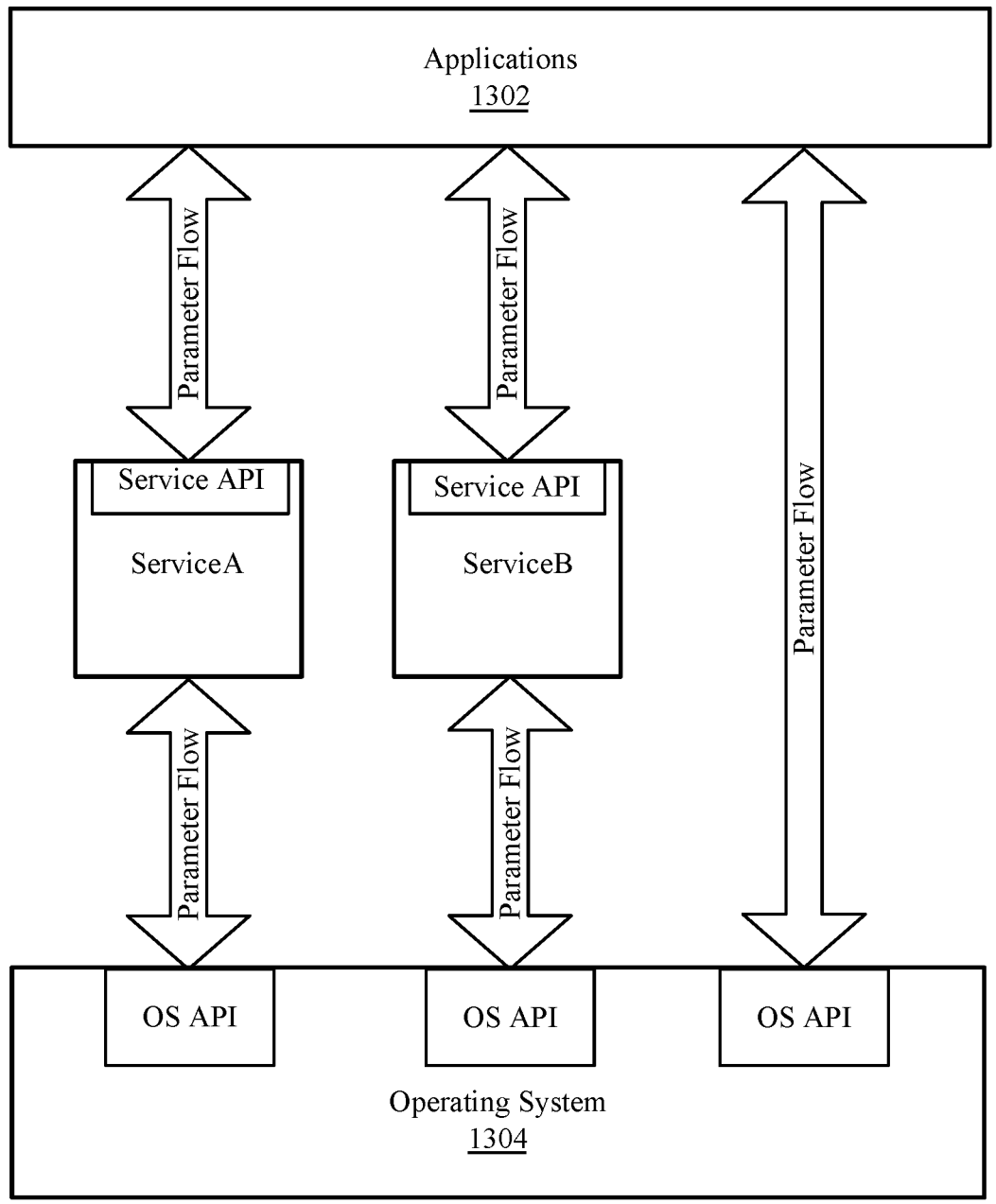
FIG. 13A-13B are block diagrams of exemplary API software stacks, according to embodiments.
Figure 13B:
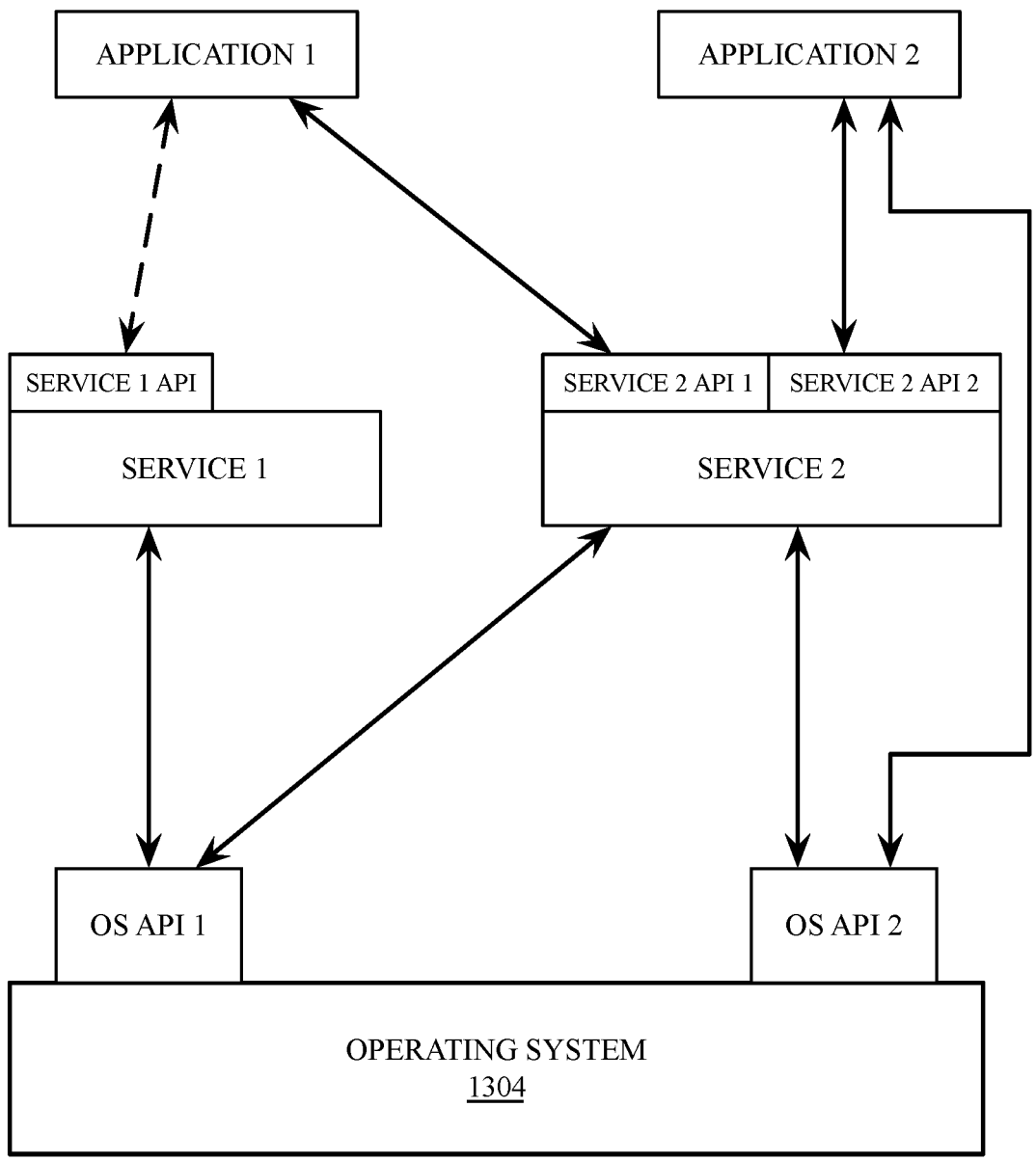

FIG. 13A-13B are block diagrams of exemplary API software stacks 1300, 1310, according to embodiments. FIG. 13A shows an exemplary API software stack 1300 in which applications 1302 can make calls to Service A or Service B using Service API and to Operating System 1304 using an OS API. Additionally, Service A and Service B can make calls to Operating System 1304 using several OS APIs.

FIG. 13B shows an exemplary API software stack 1310 including Application 1, Application 2, Service 1, Service 2, and Operating System 1304. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 14:
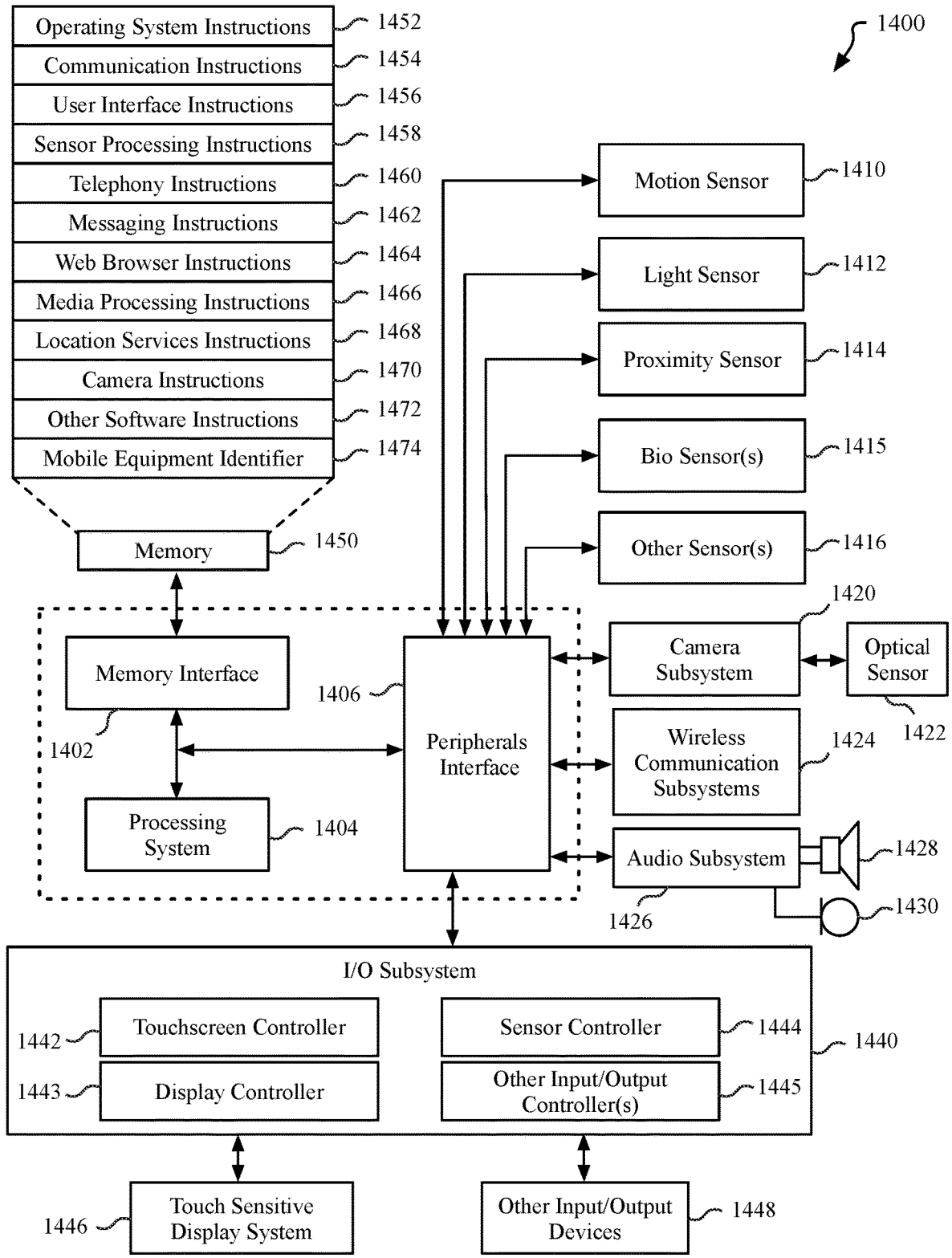
FIG. 14 is a block diagram of a device architecture for a mobile or embedded device, according to an embodiment.

FIG. 14 is a block diagram of a device architecture 1400 for a mobile or embedded device, according to an embodiment. The device architecture 1400 includes a memory interface 1402, a processing system 1404 including one or more data processors, image processors and/or graphics processing units, and a peripherals interface 1406. The various components can be coupled by one or more communication buses or signal lines. The various components can be separate logical components or devices or can be integrated in one or more integrated circuits, such as in a system on a chip integrated circuit.

The memory interface 1402 can be coupled to memory 1450, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1406 to facilitate multiple functionalities. For example, a motion sensor 1410, a light sensor 1412, and a proximity sensor 1414 can be coupled to the peripherals interface 1406 to facilitate the mobile device functionality. One or more biometric sensor(s) 1415 may also be present, such as a fingerprint scanner for fingerprint recognition or an image sensor for facial recognition. Other sensors 1416 can also be connected to the peripherals interface 1406, such as a positioning system (e.g., GPS receiver), a temperature sensor, or other sensing device, to facilitate related functionalities. A camera subsystem 1420 and an optical sensor 1422, e.g., a charged coupled device (CCD) or a complementary metal-oxide semiconductor (CMOS) optical sensor, can be utilized to facilitate camera functions, such as recording photographs and video clips.

Communication functions can be facilitated through a set of wireless communication subsystems 1424, which can include radio frequency receivers and transmitters and/or optical (e.g., infrared) receivers and transmitters. The specific design and implementation of the wireless communication subsystems 1424 can depend on the communication network(s) over which a mobile device is intended to operate. For example, a mobile device including the illustrated device architecture 1400 can include wireless communication subsystems 1424 designed to operate over a GSM network, a CDMA network, an LTE network, a Wi-Fi network, a Bluetooth network, or any other wireless network. In particular, the wireless communication subsystems 1424 can provide a communications mechanism over which a media playback application can retrieve resources from a remote media server or scheduled events from a remote calendar or event server.

An audio subsystem 1426 can be coupled to a speaker 1428 and a microphone 1430 to facilitate voice-enabled functions, such as voice recognition, voice replication, digital recording, and telephony functions. In smart media devices described herein, the audio subsystem 1426 can be a high-quality audio subsystem including support for virtual surround sound.

The I/O subsystem 1440 can include a touch screen controller 1442 and/or other input controller(s) 1445. For computing devices including a display device, the touch screen controller 1442 can be coupled to a touch sensitive display system 1446 (e.g., touch-screen). The touch sensitive display system 1446 and touch screen controller 1442 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1446. Display output for the touch sensitive display system 1446 can be generated by a display controller 1443. In one embodiment, the display controller 1443 can provide frame data to the touch sensitive display system 1446 at a variable frame rate.

In one embodiment, a sensor processor 1444 is included to monitor, control, and/or processes data received from one or more of the motion sensor 1410, light sensor 1412, proximity sensor 1414, or other sensors 1416. The sensor processor 1444 can include logic to interpret sensor data to determine the occurrence of one of more motion events or activities by analysis of the sensor data from the sensors. In one embodiment the sensor processor 1444 also manages the camera subsystem 1420 and audio subsystem 1426, with couple with the sensor processor 1444 via the peripherals interface 1406. Multimedia captured by the camera subsystem 1420 and/or audio subsystem 1426 may be relayed to the memory 1450 to be accessed by software executing on the processing system 1404, or processed by the sensor processor 1444 or other processors in the system to determine environmental metadata. In one embodiment, the sensor processor may configure a live audio stream to a hearing-aid device or wireless earbuds that are connected via a wireless processor, enabling the audio stream to bypass the processing system 1404 and memory 1450.

In one embodiment, the I/O subsystem 1440 includes other input controller(s) 1445 that can be coupled to other input/control devices 1448, such as one or more buttons, rocker switches, thumb-wheel, infrared port, USB port, and/or a pointer device such as a stylus, or control devices such as an up/down button for volume control of the speaker 1428 and/or the microphone 1430.

In one embodiment, the memory 1450 coupled to the memory interface 1402 can store instructions for an operating system 1452, including portable operating system interface (POSIX) compliant and non-compliant operating system or an embedded operating system. The operating system 1452 may include instructions for handling basic system services and for performing hardware dependent tasks. In some implementations, the operating system 1452 can be a kernel.

The memory 1450 can also store communication instructions 1454 to facilitate communicating with one or more additional devices, one or more computers and/or one or more servers, for example, to retrieve web resources from remote web servers. The memory 1450 can also include user interface instructions 1456, including graphical user interface instructions to facilitate graphic user interface processing.

Additionally, the memory 1450 can store sensor processing instructions 1458 to facilitate sensor-related processing and functions; telephony instructions 1460 to facilitate telephone-related processes and functions; messaging instructions 1462 to facilitate electronic-messaging related processes and functions; web browser instructions 1464 to facilitate web browsing-related processes and functions; media processing instructions 1466 to facilitate media processing-related processes and functions; location services instructions including GPS and/or navigation instructions 1468 and Wi-Fi based location instructions to facilitate location based functionality; camera instructions 1470 to facilitate camera-related processes and functions; and/or other software instructions 1472 to facilitate other processes and functions, e.g., security processes and functions, and processes and functions related to the systems. The memory 1450 may also store other software instructions such as web video instructions to facilitate web video-related processes and functions; and/or web shopping instructions to facilitate web shopping-related processes and functions. In some implementations, the media processing instructions 1466 are divided into audio processing instructions and video processing instructions to facilitate audio processing-related processes and functions and video processing-related processes and functions, respectively. A mobile equipment identifier, such as an International Mobile Equipment Identity (IMEI) 1474 or a similar hardware identifier can also be stored in memory 1450.

Each of the above identified instructions and applications can correspond to a set of instructions for performing one or more functions described above. These instructions need not be implemented as separate software programs, procedures, or modules. The memory 1450 can include additional instructions or fewer instructions. Furthermore, various functions may be implemented in hardware and/or in software, including in one or more signal processing and/or application specific integrated circuits.

Figure 15:
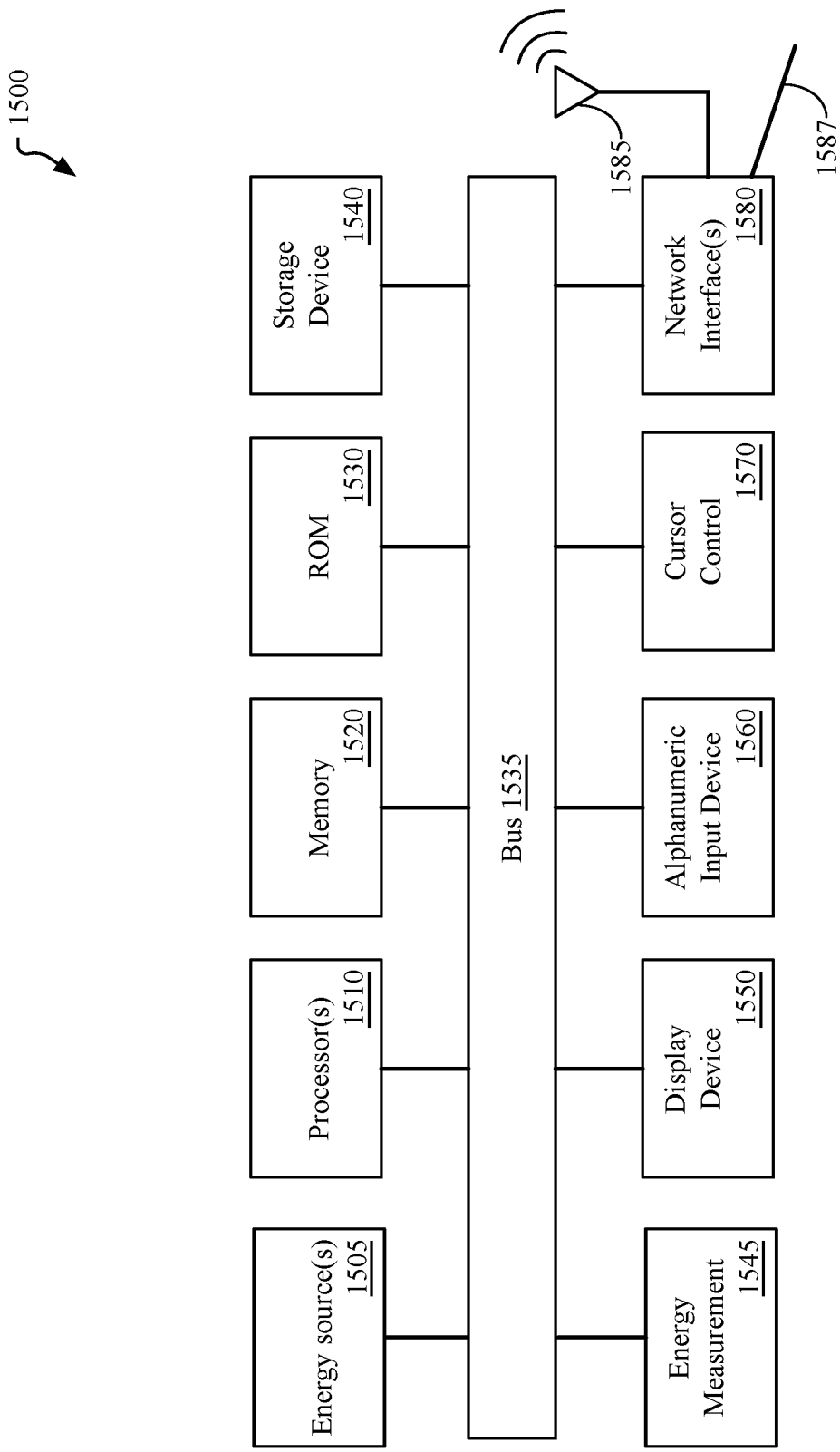
FIG. 15 is a block diagram of a computing system, according to an embodiment.

FIG. 15 is a block diagram of a computing system 1500, according to an embodiment. The illustrated computing system 1500 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1500 can be used to provide the computing device and/or a server device to which the computing device may connect.

The computing system 1500 includes bus 1535 or other communication device to communicate information, and processor(s) 1510 coupled to bus 1535 that may process information. While the computing system 1500 is illustrated with a single processor, the computing system 1500 may include multiple processors and/or co-processors. The computing system 1500 further may include memory 1520, which can be random access memory (RAM) or other dynamic storage device coupled to the bus 1535. The memory 1520 may store information and instructions that may be executed by processor(s) 1510. The memory 1520 may also be used to store temporary variables or other intermediate information during execution of instructions by the processor(s) 1510.

The computing system 1500 may also include read only memory (ROM) 1530 and/or another data storage device 1540 coupled to the bus 1535 that may store information and instructions for the processor(s) 1510. The data storage device 1540 can be or include a variety of storage devices, such as a flash memory device, a magnetic disk, or an optical disc and may be coupled to computing system 1500 via the bus 1535 or via a remote peripheral interface.

The computing system 1500 may also be coupled, via the bus 1535, to a display device 1550 to display information to a user. The computing system 1500 can also include an alphanumeric input device 1560, including alphanumeric and other keys, which may be coupled to bus 1535 to communicate information and command selections to processor(s) 1510. Another type of user input device includes a cursor control 1570 device, such as a touchpad, a mouse, a trackball, or cursor direction keys to communicate direction information and command selections to processor(s) 1510 and to control cursor movement on the display device 1550. The computing system 1500 may also receive user input from a remote device that is communicatively coupled via one or more network interface(s) 1580.

The computing system 1500 further may include one or more network interface(s) 1580 to provide access to a network, such as a local area network. The network interface(s) 1580 may include, for example, a wireless network interface having antenna 1585, which may represent one or more antenna(e). The computing system 1500 can include multiple wireless network interfaces such as a combination of Wi-Fi, Bluetooth®, near field communication (NFC), and/or cellular telephony interfaces. The network interface(s) 1580 may also include, for example, a wired network interface to communicate with remote devices via network cable 1587, which may be, for example, an Ethernet cable, a coaxial cable, a fiber optic cable, a serial cable, or a parallel cable.

In one embodiment, the network interface(s) 1580 may provide access to a local area network, for example, by conforming to IEEE 802.15 standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1580 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1500 can further include one or more energy sources 1505 and one or more energy measurement systems 1545. Energy sources 1505 can include an AC/DC adapter coupled to an external power source, one or more batteries, one or more charge storage devices, a USB charger, or other energy source. Energy measurement systems include at least one voltage or amperage measuring device that can measure energy consumed by the computing system 1500 during a predetermined period of time. Additionally, one or more energy measurement systems can be included that measure, e.g., energy consumed by a display device, cooling subsystem, Wi-Fi subsystem, or other frequently used or high-energy consumption subsystem.

Computing System with a Secure Processor

Figure 16:
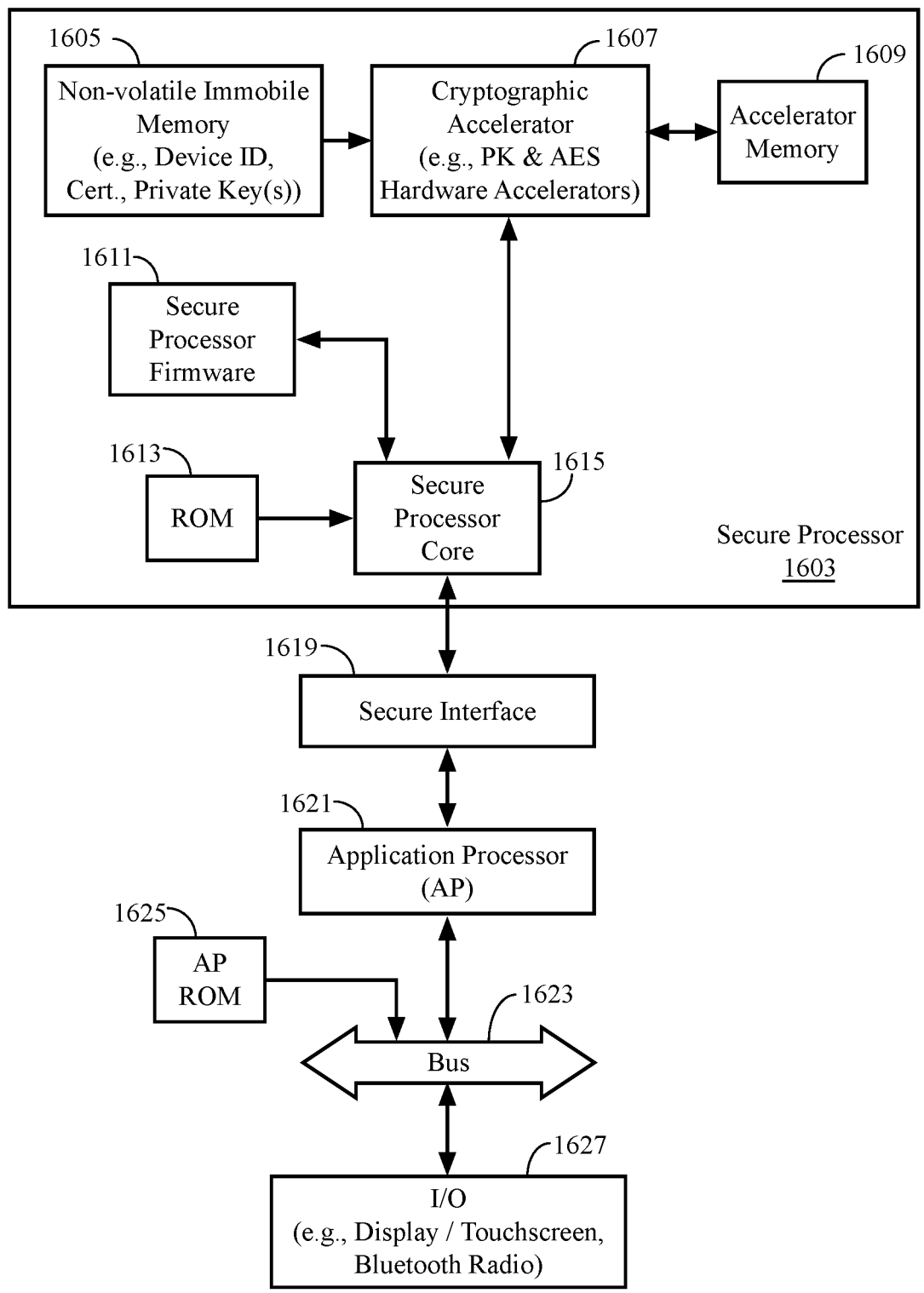
FIG. 16 illustrates a computing system including a secure processor, according to an embodiment.

FIG. 16 illustrates a computing system 1600 including a secure processor, according to an embodiment. In one embodiment the illustrated secure processor 1603 is a secure enclave processor, although other types of secure processors may be used to accelerate cryptographic operations described herein. The computing system 1600 can enable a device to perform secure accelerated cryptographic operations, to provide secure storage for a subset of private keys, and to enable the encryption of other private keys. A version of the computing system 1600 can be included in a primary device (e.g., smartphone) and a secondary device (e.g., computing device, wearable device, wireless accessory) as described herein.

The computing system 1600 includes an application processor 1621 that is communicably coupled with a secure processor 1603 via a secure interface 1619. The computing system 1600 can be a portion of any of the client devices described herein. Additionally, the computing system 1600 can be included into one or more of the servers described herein. In one embodiment, the secure processor 1603 can be implemented as a system on chip. In another embodiment, the application processor 1621 and the secure processor 1603 can be implemented on a system on chip and include one or more processors and memory controllers and other components on a single integrated circuit.

The secure processor 1603 can perform cryptographic operations as described herein, as well as other system security operations such as encrypting user files or verifying code signatures, processing user passcodes, or performing other security operations. The cryptographic operations can be performed in part by the secure processor core 1615 by executing software stored as firmware 1611 in the secure processor 1603. The secure processor core 1615 can also be coupled to a ROM 1613 which can be trusted software that can validate the software in the firmware 1611 before allowing that firmware to execute by checking a code signature of the firmware and verifying that the signature code indicates that the firmware is valid and has not been corrupted before allowing the firmware to be executed by the secure processor core 1615.

The secure processor 1603 can also include a cryptographic accelerator such as cryptographic accelerator 1607 which can perform asymmetric cryptography as well as symmetric cryptography using a hardware accelerator. The cryptographic accelerator 1607 can be coupled to a memory 1605, which can be a non-volatile and immutable memory that is used to store, in a secure manner, a device identifier or a set of device identifiers and a set of one or more certificates and private keys which are hidden from the rest of the system and are not readable by the rest of the system in one embodiment. The cryptographic accelerator 1607 has access to the private keys and other data within the memory 1605 and access to the memory 1605 is not allowed for components outside of the secure processor 1603. In one embodiment, the cryptographic accelerator 1607 can be coupled to an accelerator memory 1609 which can be a scratch pad memory used to perform the cryptographic operations that are performed by the cryptographic accelerator 1607. The application processor 1621 can be coupled to one or more buses 1623 which are coupled to one or more input and output (I/O) devices 1627, such as a touchscreen display a Bluetooth radio, an NFC radio, a Wi-Fi radio, etc. Other input and output devices can be included. The application processor 1621 is also coupled to an application processor ROM 1625, which provides software to boot the application processor. Similarly, the ROM 1613 provides code to boot the secure processor core 1615 within the secure processor 1603.

Embodiments described herein provide systems and methods that implement a signed, encrypted, and compressed container that may be decrypted, decompressed, and authenticated in a streaming manner. A signed, encrypted, and/or compressed archive or container described herein can be appended to without reading and recomputing the authentication tags on existing encrypted and authenticated data. New data can be appended that is compressed and/or separately encrypted. Accordingly, existing data is not required to be decrypted and/or decompressed before new encrypted and/or compressed data is added to the archive. Furthermore, data can be decompressed and decrypted out of order, enabling random access to an archive and parallel access of multiple segments using multiple network streams while still preserving authenticity guarantees. Streaming decryption is secured in part via the use of collision-resistant MAC functions that enable tamper detection even in the event that an attacker possesess the archive encryption key. Furthermore, the use of an encrypted signature enables signature hiding for encrypted assets, such that the asseets may be stored to unsecured locations without leaking the source of the archive via an unencrypted signature.

One embodiment provides for a method comprising, on a computing device having one or more processors, receiving a request to access data at a specified location within an archive container, wherein the archive is a signed, encrypted, and compressed container that is encrypted using authenticated encryption or AEAD logic. The method additionally includes retrieving stored cryptographic material used to unlock and authenticate the archive container, deriving a multi-level key hierarchy from the stored cryptographic material, and decrypting, decompressing, and authenticating data at the specified location within the archive without requiring the decryption, decompression, and authentication of the entire archive or container.

One embodiment provides a non-transitory machine-readable medium storing instructions which, when executed by one or more processors, cause the one or more processors to perform operations of the above method.

One embodiment provides a data processing system comprising one or more processors and a memory device to store instructions which, when executed by the one or more processors, cause the one or more processors to perform the above method.

One embodiment provides an apparatus comprising means to perform the above method.

In some embodiments, the hash functions described herein (e.g. SHA256) can utilize specialized hardware circuitry (or firmware) of the system (client device or server). For example, the function can be a hardware-accelerated function. In addition, in some embodiments, the system can use a function that is part of a specialized instruction set. For example, the can use an instruction set which may be an extension to an instruction set architecture for particular a type of microprocessors. Accordingly, in an embodiment, the system can provide a hardware-accelerated mechanism for performing SHA operations. Accordingly, the system can improve the speed of performing the functions described herein using these instruction sets.

In addition, the hardware-accelerated engines/functions are contemplated to include any implementations in hardware, firmware, or combination thereof, including various configurations which can include hardware/firmware integrated into the SoC as a separate processor, or included as special purpose CPU (or core), or integrated in a coprocessor on the circuit board, or contained on a chip of an extension circuit board, etc.

Accordingly, although such accelerated functions are not necessarily required to implement differential privacy, some embodiments herein, can leverage the prevalence of specialized support for such functions (e.g. cryptographic functions) to potentially improve the overall efficiency of implementations.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally various components described herein can be a means for performing the operations or functions described herein. Accordingly, the true scope of the embodiments will become apparent to the skilled practitioner upon a study of the drawings, specification, and following claims.

What is claimed is:

1. A method comprising:
on a computing device having one or more processors:
  receiving a request to access data at a specified location within an archive, wherein the archive includes a signed and compressed container that is encrypted via authenticated encryption of a container that includes clusters, each including segments;
  retrieving stored cryptographic material used to unlock and authenticate the container;
  deriving a multi-level key hierarchy from the stored cryptographic material, the multi-level key hierarchy including (1) a set of cluster keys derived from an archive main key, wherein each cluster key of the set of cluster keys authenticates respective cluster data and (2) segment keys for performing cryptographic operations within segments of respective clusters of the container; and
  decrypting, decompressing, and authenticating, using the set of cluster keys and the segments keys, data at the specified location within the archive without decrypting, decompressing, or authenticating the entire container.

2. The method as in claim 1, wherein retrieving stored cryptographic material used to unlock and authenticate the container includes retrieving an archive encryption key.

3. The method as in claim 2, further comprising:
determining an encryption profile associated with the container,
deriving the archive main key based on the archive encryption key and the encryption profile, and
deriving the segment keys based on the set of cluster keys.

4. The method as in claim 3, wherein metadata for data at the specified location within the container is stored in an encrypted format and accessing a first portion of the metadata includes:

deriving a first header key based on the archive main key and the encryption profile;
retrieving a first header from the archive;
decrypting the first header via the first header key; and
reading the first portion of the metadata from the first header.

5. The method as in claim 4, wherein accessing a second portion of the metadata includes:
deriving a first cluster key for a first cluster of the container, wherein the first cluster includes the data at the specified location and the first cluster key is derived based on the archive main key and the encryption profile;
deriving a second header key that is specific to a second header, wherein the second header is a header of the first cluster;
decrypting the second header via the second header key; and
reading the second portion of the metadata from the second header.

6. The method as in claim 4, further comprising:
retrieving a signature from the container;
deriving a signature encryption key from the archive main key and the encryption profile;
decrypting the signature via the signature encryption key; and
verifying the signature via a signature verification key that differs from the signature encryption key.

7. The method as in claim 1, wherein decrypting, decompressing, and authenticating the data at the specified location comprises:
authenticating first cluster data of a first cluster of the clusters using a first cluster key of the set of cluster keys; and
decrypting a first segment at the specified location within the first cluster using a first segment key from among the segment keys.

8. A non-transitory machine-readable medium storing instructions which, when executed by one or more processors, cause the one or more processors to perform operations comprising:
receiving a request to access data at a specified location within an archive, wherein the archive includes a signed and compressed container that is encrypted via authenticated encryption of a container that includes clusters, each including segments;
retrieving stored cryptographic material used to unlock and authenticate the container;
deriving a multi-level key hierarchy from the stored cryptographic material, the multi-level key hierarchy including (1) a set of cluster keys derived from an archive main key, wherein each cluster key of the set of cluster keys authenticates respective cluster data and (2) segment keys for performing cryptographic operations within segments of respective clusters of the container; and
decrypting, decompressing, and authenticating, using the set of cluster keys and the segments keys, data at the specified location within the archive without decrypting, decompressing, or authenticating the entire container.

9. The non-transitory machine-readable medium as in claim 8, wherein retrieving stored cryptographic material used to unlock and authenticate the container includes retrieving an archive encryption key.

10. The non-transitory machine-readable medium as in claim 9, the operations further comprising determining an encryption profile associated with the container and deriving the archive main key based on the archive encryption key and the encryption profile.

11. The non-transitory machine-readable medium as in claim 10, wherein metadata for data at the specified location within the container is stored in an encrypted format and accessing a first portion of the metadata includes:
deriving a first header key based on the archive main key and the encryption profile;
retrieving a first header from the archive;
decrypting the first header via the first header key; and
reading the first portion of the metadata from the first header.

12. The non-transitory machine-readable medium as in claim 11, wherein accessing a second portion of the metadata includes:
deriving a first cluster key for a first cluster of the container, wherein the first cluster includes the data at the specified location and the first cluster key is derived based on the archive main key and the encryption profile;
deriving a second header key that is specific to a second header, wherein the second header is a header of the first cluster;
decrypting the second header via the second header key; and
reading the second portion of the metadata from the second header.

13. The non-transitory machine-readable medium as in claim 11, the operations further comprising:
retrieving a signature from the container;
deriving a signature encryption key from the archive main key and the encryption profile;
decrypting the signature via the signature encryption key; and
verifying the signature via a signature verification key that differs from the signature encryption key.

14. The non-transitory machine-readable medium as in claim 8, wherein the operation of decrypting, decompressing, and authenticating the data at the specified location comprises the operations of:
authenticating first cluster data of a first cluster of the clusters using a first cluster key of the set of cluster keys; and
decrypting a first segment at the specified location within the first cluster using a first segment key from among the segment keys.

15. A data processing system comprising:
a memory to store instructions; and
one or more processors to execute instructions stored in memory, wherein the instructions cause the one or more processors to perform operations comprising:
receiving a request to access data at a specified location within an archive, wherein the archive includes a signed and compressed container that is encrypted via authenticated encryption of a container that includes clusters, each including segments;
retrieving stored cryptographic material used to unlock and authenticate the container;
deriving a multi-level key hierarchy from the stored cryptographic material, the multi-level key hierarchy including (1) a set of cluster keys derived from an archive main key, wherein each cluster key of the set of cluster keys authenticates respective cluster data and (2) segment keys for performing cryptographic operations within segments of respective clusters of the container; and decrypting, decompressing, and authenticating, using the set of cluster keys and the segments keys, data at the specified location within the archive without decrypting, decompressing or authenticating, the entire container.

16. The data processing system as in claim 15, wherein retrieving stored cryptographic material used to unlock and authenticate the container includes retrieving an archive encryption key.

17. The data processing system as in claim 16, the operations further comprising determining an encryption profile associated with the container and deriving the archive main key based on the archive encryption key and the encryption profile, wherein deriving the archive main key based on the archive encryption key and the encryption profile additionally includes deriving the archive main key additionally based on a signing public key of a creator of the archive.

18. The data processing system as in claim 17, wherein metadata for data at the specified location within the container is stored in an encrypted format and accessing a first portion of the metadata includes:
   deriving a first header key based on the archive main key and the encryption profile;
   retrieving a first header from the archive;
   decrypting the first header via the first header key; and
   reading the first portion of the metadata from the first header.

19. The data processing system as in claim 18, wherein accessing a second portion of the metadata includes:
   deriving a first cluster key for a first cluster of the container, wherein the first cluster includes the data at the specified location and the first cluster key is derived based on the archive main key and the encryption profile;
   deriving a second header key that is specific to a second header, wherein the second header is a header of the first cluster;
   decrypting the second header via the second header key; and
   reading the second portion of the metadata from the second header.

20. The data processing system as in claim 18, the operations further comprising:
   retrieving a signature from the container;
   deriving a signature encryption key from the archive main key and the encryption profile;
   decrypting the signature via the signature encryption key; and
   verifying the signature via a signature verification key that differs from the signature encryption key.

21. The system as in claim 15, wherein the operation of decrypting, decompressing, and authenticating the data at the specified location comprises the operations of:
   authenticating first cluster data of a first cluster of the clusters using a first cluster key of the set of cluster keys; and
   decrypting a first segment at the specified location within the first cluster using a first segment key from among the segment keys.

\* \* \* \* \*